(12) United States Patent
Sadasivan

(10) Patent No.: US 8,957,129 B2
(45) Date of Patent: Feb. 17, 2015

(54) AQUEOUS COATINGS AND PAINTS INCORPORATING ONE OR MORE ANTIMICROBIAL BIOSURFACTANTS AND METHODS FOR USING SAME

(71) Applicant: Rhodia Operations, Aubervilliers (FR)

(72) Inventor: Lakshmi Sadasivan, Langhorne, PA (US)

(73) Assignee: Rhodia Operations, Aubervilliers (FR)

( * ) Notice: Subject to any disclaimer, the term of this patent is extended or adjusted under 35 U.S.C. 154(b) by 1 day.

(21) Appl. No.: 13/888,089

(22) Filed: May 6, 2013

(65) Prior Publication Data

US 2013/0296461 A1 Nov. 7, 2013

Related U.S. Application Data

(60) Provisional application No. 61/643,855, filed on May 7, 2012.

(51) Int. Cl.
*C09D 5/14* (2006.01)
*C08F 2/24* (2006.01)

(52) U.S. Cl.
CPC ........................................ *C09D 5/14* (2013.01)
USPC ........................................ 523/122; 524/732

(58) Field of Classification Search
CPC ................................... C09D 5/14; C08F 2/24
USPC ........................................ 523/122; 524/732
See application file for complete search history.

(56) References Cited

U.S. PATENT DOCUMENTS

| | | | |
|---|---|---|---|
| 4,216,311 A | 8/1980 | Inoue et al. | |
| 5,373,016 A | 12/1994 | Brown et al. | |
| 5,597,735 A | 1/1997 | Laszlo et al. | |
| 6,361,788 B1 | 3/2002 | Antoni-Zimmermann et al. | |
| 7,348,382 B2 | 3/2008 | Ueno et al. | |
| 7,659,326 B2 | 2/2010 | McCarthy | |
| 7,691,193 B2 | 4/2010 | Okada et al. | |
| 7,893,174 B2 | 2/2011 | Matyjaszewski et al. | |
| 2003/0022970 A1 | 1/2003 | Zhao et al. | |
| 2003/0229171 A1 | 12/2003 | Zhao et al. | |
| 2004/0033598 A1 | 2/2004 | Vacanti et al. | |
| 2004/0171128 A1 | 9/2004 | Yalpani | |
| 2004/0209311 A1 | 10/2004 | Latov et al. | |
| 2006/0014861 A1 | 1/2006 | Geesey et al. | |
| 2007/0203126 A1 | 8/2007 | Carlson et al. | |
| 2007/0207930 A1 | 9/2007 | Gandhi et al. | |
| 2008/0139399 A1 | 6/2008 | Fonnum et al. | |
| 2008/0193730 A1 | 8/2008 | Ohkubo et al. | |
| 2008/0213194 A1 | 9/2008 | DeSanto | |
| 2008/0269337 A1 | 10/2008 | Breen et al. | |
| 2008/0305348 A1 | 12/2008 | Spedden | |
| 2009/0126948 A1 | 5/2009 | DeSanto | |
| 2010/0022392 A1 | 1/2010 | Long | |
| 2010/0081735 A1 | 4/2010 | Mao et al. | |
| 2010/0160445 A1 | 6/2010 | Carlson et al. | |
| 2010/0222481 A1 | 9/2010 | Jersak et al. | |
| 2010/0272690 A1 | 10/2010 | Gandhi et al. | |
| 2011/0236880 A1 | 9/2011 | Callahan et al. | |
| 2011/0237531 A1 | 9/2011 | Yanagisawa et al. | |
| 2011/0270207 A1 | 11/2011 | DeSanto | |

FOREIGN PATENT DOCUMENTS

| | | |
|---|---|---|
| DE | 102006020728 A1 | 11/2006 |
| EP | 0499434 A1 | 8/1992 |
| JP | 2007039605 A | 2/2007 |
| JP | 2009057627 A | 3/2009 |
| WO | 2007/095258 A2 | 8/2007 |
| WO | 2008013899 A2 | 1/2008 |
| WO | 2012/010406 A1 | 1/2012 |

OTHER PUBLICATIONS

International Search Report mailed Sep. 25, 2013 in PCT application No. PCT/US2013/039756.
Written Opinion of the International Searching Authority mailed Sep. 25, 2013 in PCT application No. PCT/US2013/039756.
I.M. Banat et al, "Patential commercial applications of microbial surfactants", Appl. Microbiol. Biotechnol., vol. 53, 2000, pp. 495-508, XP002724535.
International Search Report and the Written Opinion dated May 30, 2014 from PCT/IB2013/002469.
"Surfactants", BASF The Chemical Company, BASF The Chemical Company, Apr. 2013.
Letizia Fracchia et al., "Biosurfactants and Bioemulsifiers Biomedical and Related Applications—Present Status and Future Potentials", pp. 325-369, in the book "Biomedical Science, Engineering and Technology" edited by Dhanjoo N. Ghista, ISBN 978-953-307-471-9, InTech, Jan. 1, 2012.
"Geropon WS—25I", Product Data Sheet, Aug. 2011.
"Agnique® PG 8105-G", Home Care and I&I BASR, Product Details, URL <http://www.homecare-and-i-and-i.basf.com/ProductDetails?PRD=30530207> retrieved from the Internet May 3, 2013, BASF The Chemical Company.
"Biopesticides Registration Action Document", U.S. Environmental Protection Agency, Office of Pesticide Programs, Biopesticides and Pollution Prevention Division, Rhamnolipid Biosurfactant (PC Code 110029), URL <http://www.epa.gov/oppbppdl/biopesticides/ingredients/factsheets/factsheet_110029.htm> retrieved from the Internet Dec. 9, 2011.

(Continued)

*Primary Examiner* — Nathan M Nutter
(74) *Attorney, Agent, or Firm* — Novak Druce Connolly Bove + Quigg LLP

(57) ABSTRACT

Disclosed is an aqueous coating composition including at least one latex polymer derived from at least one monomer copolymerized or blended with a rhamnolipid and/or sophorolipid biosurfactant. Also provided is an aqueous architectural coating composition including at least one latex polymer derived from at least one monomer copolymerized or blended with a rhamnolipid and/or sophorolipid biosurfactant, at least one pigment, and water. Also provided is a method of preparing an aqueous architectural coating composition such as a latex paint including the above components.

32 Claims, 7 Drawing Sheets

(56) References Cited

OTHER PUBLICATIONS

"Global Biosurfactants Market by Type, Region and Applications (2011-2016)", URL <http://www.marketsandmarkets.com/Market-Reports/biosurfactants-market-493.html> retrieved from the Internet May 4, 2012, MarketsandMarkets, Jun. 2012.
"BYK-345", BYK Additives & Instruments, BYK-Chemie GmbH, Feb. 2013.
Letizia Fracchia et al., "Biosurfactants and Bioemulsifiers Biomedical and Related Applications—Present Status and Future Potentials", Biomedical Science, Engineering and Technology, pp. 325-369.
I. O. Moraes et al., "Production and Characterization of Rhamnolipids Produced by a Newly Isolated Strain of Pseudomonas aeruginosa", Brazilian Journal of Food Technology, pp. 145-149, Braz. J. Food Technol., 5:145-149, 2002.
Pattanathu K.S.M. Rahman et al., "Production, Characterisation and Applications of Biosurfactants-Review", Asian Network for Scientific Information, pp. 360-370, Biotechnology 7 (2): 360-370, 2008, ISSN 1682-296X, 2008.
Ramkrishna Sen, "Biosurfactants", Advances in Experimental Medicine and Biology, vol. 672, ISBN: 978-1-4419-5978-2, Feb. 16, 2010, Landes Bioscience Books: Special Books, URL<http://www.landesbioscience.com/books/special/id/1791/?nocache=1153387481> retrieved from the Internet May 4, 2012 (Only Abstract).
"Rhamnolipid biosurfactant (110029) Fact Sheet", Pesticides, US EPA, URL <http://www.epa.gov/oppbppd1/biopesticides/ingredients/factsheets/factsheet_110029.htm> retrieved from the Internet Dec. 9, 2011.
"Rhamnolipid Biosurfactant; Notice of Filing a Pesticide Petition to Establish a Tolerance for a Certain Pesticide Chemical in or on Food", Federal Register, The Daily Journal of the United States Government. URL <https://www.federalregister.gov/articles/2003/05/09/03-11478/rhamnolipid-biosurfactant-no . . . > retrieved from the Internet May 4, 2012.
"Rhamnolipids", Rhamnolipid, Inc, URL <http://www.rhamnolipid.com> retrieved from the Internet Jan. 15, 2012.
"Rhamnolipid Products for Sale", URL <http://www.rhamnolipid.net/RhamnolipidProducts.html> retrieved from the Internet Jan. 15, 2012.
"Rhodoline® 286N", Product Data Sheet N001018, Rhodia Member of the Solvay group, Apr. 2012.
"Thodoline 697", URL <http://www.rhodia.com/en/markets_and_products/product_finder/product_details.tcm?prod . . . > retrieved from the Internet May 3, 2013, Solvay, 2013.
"Rhodoline® 697", Product Data Sheet N001040, Rhodia, Jun. 2009.
"Rhodoline® WA-100", Product Data Sheet N002435, Rhodia, Jan. 2010.

AQUEOUS COATINGS AND PAINTS INCORPORATING ONE OR MORE ANTIMICROBIAL BIOSURFACTANTS AND METHODS FOR USING SAME

CROSS-REFERENCE TOP RELATED APPLICATION

This claims the benefit of U.S. provisional patent application No. 61/643,855 filed May 7, 2012, incorporated herein by reference in its entirety.

FIELD OF THE INVENTION

The present invention relates to compositions and methods using biosurfactants for making architectural coatings, for example paints. In particular, the present invention relates to using biosurfactants as emulsifiers in emulsion polymerization for making aqueous latex dispersions, aqueous latex coatings, aqueous latex binders and aqueous latex paints. Also, the present invention relates to using biosurfactants as additives for aqueous latex dispersions, aqueous latex coatings, aqueous latex binders and aqueous latex paints. The biosurfactants typically comprise rhamnolipids or sophorolipids. The biosurfactants also act as biocides and mildewcides to provide a safe, environmentally friendly "green" and natural alternative to the potentially less environmentally friendly chemicals, such as surfactants and biocides, currently being used for this goal. A big advantage of the present invention is also that using biosurfactants can reduce or eliminate the use of these potentially less environmentally friendly surfactants and biocides.

BACKGROUND OF THE INVENTION

Paint is any liquid, liquefiable, or mastic composition which, after application to a substrate in a thin layer, is converted to a solid film. It is most commonly used to protect, color or provide texture to objects. Paint contains a binder (also known as a vehicle or resin), a diluent or solvent, a pigment or filler, and may also have other additives. The binder, commonly called the vehicle, is the film-forming component of paint. It is the only component that must be present. Components listed below are included optionally, depending on the desired properties of the cured film.

The binder imparts adhesion and strongly influences such properties as gloss, durability, flexibility, and toughness. In latex paint the binder comprises latex.

Latex is a stable dispersion (colloidal emulsion) of polymer microparticles in an aqueous medium. Thus, it is a suspension/dispersion of rubber or plastic polymer microparticles in water. Latexes may be natural or synthetic. Polymerization is a preferred technology used to make emulsion polymers and polymer latexes.

Latex paint is a water-borne dispersion of sub-micrometer polymer particles. The term "latex" in the context of paint simply means an aqueous dispersion; latex rubber (the sap of the rubber tree that has historically been called latex) is not an ingredient. The use of latex, produced by emulsion polymerization, in the production of paints or coatings for substrates is well known in the art.

Three categories of polymers produced by emulsion polymerization are: (1) Synthetic rubber: some grades of styrene-butadiene (SBR), Some grades of polybutadiene, polychloroprene (Neoprene), nitrile rubber, acrylic rubber, fluoroelastomer (FKM); (2) Plastic: Some grades of PVC, some grades of polystyrene, some grades of PMMA (polymethylmethacrylate), Acrylonitrile-butadiene-styrene terpolymer (ABS), polyvinylidene fluoride, polytetrafluoroethylene (PTFE); and (3) Dispersions (polymers sold as aqueous dispersions, for example, latex).

Latex paints are used for a variety of applications including interior and exterior, and flat, semi-gloss and gloss applications. Latex polymer binder is a latex polymer which coalesces to form a film. Latex paints cure by a process called coalescence where first the water, and then the trace, or coalescing, solvent, evaporate and draw together and soften the latex polymer binder particles and fuse them together into irreversibly bound networked structures, so that the paint will not redissolve in the solvent/water that originally carried it. This is a characteristic of paints which distinguishes from, for example, aqueous desktop inkjet printer inks. However, such paints or coatings are adversely affected by the presence of emulsifiers required in the emulsion polymerization process. Furthermore, in latex polymerization, surfactants are necessary to provide stable monomer pre-emulsion, stability during the polymerization, and overall stability of the final latex. The residual surfactants in paint as well as hydrolytic effects with some polymers may cause the paint to remain susceptible to softening and, over time, degradation by water.

The main purposes of the diluent are to dissolve the polymer and adjust the viscosity of the paint. It is volatile and does not become part of the paint film. It also controls flow and application properties, and in some cases can affect the stability of the paint while in liquid state. Its main function is as the carrier for the non volatile components. To spread heavier oils (for example, linseed) as in oil-based interior house paint, a thinner oil is required. These volatile substances impart their properties temporarily—once the solvent has evaporated, the remaining paint is fixed to the surface. This component is optional: some paints have no diluent. Water is the main diluent for water-borne paints, even the co-solvent types. Solvent-borne, also called oil-based, paints can have various combinations of organic solvents as the diluent, including aliphatics, aromatics, alcohols, ketones and white spirit. Specific examples are organic solvents such as petroleum distillate, esters, glycol ethers, and the like. Sometimes volatile low-molecular weight synthetic resins also serve as diluents.

Pigments are granular solids incorporated in the paint to contribute color. Fillers are granular solids incorporate to impart toughness, texture, give the paint special properties, or to reduce the cost of the paint. Alternatively, some paints contain dyes instead of or in combination with pigments. Pigments can be classified as either natural or synthetic types. Natural pigments include various clays, calcium carbonate, mica, silicas, and talcs. Synthetics would include engineered molecules, calcined clays, blanc fixe, precipitated calcium carbonate, and synthetic pyrogenic silicas. Hiding pigments, in making paint opaque, also protect the substrate from the harmful effects of ultraviolet light. Hiding pigments include titanium dioxide, phthalo blue, red iron oxide, and many others. Fillers are a special type of pigment that serve to thicken the film, support its structure and increase the volume of the paint. Fillers are usually cheap and inert materials, such as diatomaceous earth, talc, lime, barytes, clay, etc. Floor paints that will be subjected to abrasion may contain fine quartz sand as filler. Not all paints include fillers. On the other hand, some paints contain large proportions of pigment/filler and binder.

Besides the three main categories of ingredients, paint can have a wide variety of miscellaneous additives, which are usually added in small amounts, yet provide a significant effect on the product. Some examples include additives to modify surface tension, improve flow properties, improve the finished appearance, increase wet edge, improve pigment stability, impart antifreeze properties, control foaming, control skinning, etc. Other types of additives include catalysts, thickeners, stabilizers, emulsifiers, texturizers, adhesion promoters, UV stabilizers, flatteners (de-glossing agents), biocides to fight bacterial growth, and the like. Additives normally do not significantly alter the percentages of individual components in a formulation In the paints and coatings additives market, surfactants and biocides are important components in a formulation for various reasons. Surfactants are used as wetting, anti-foaming and dispersing agents. Biocides are used for controlling microbes from spoilage and protect dry films from mildew growth.

Biocides and mildewcides are two classes of antimicrobial agents used in a can of paint for two main goals. Biocides, also known as in-can preservatives, are used to preserve wet paints from spoilage due to bacterial growth whereas mildewcides are used to protect dry films from fungal deteriorations. Biocides belonging to different classes of chemistries such as formaldehyde releasers, isothiazolinones, carbamates and thiols are used for their various properties. Some of the chemistries are either listed as carcinogens or are corrosive and sensitizers.

Dry film fungicides or mildewcides usage has recently increased for interior paints since the year 2000, because of the flooding and building damages due to hurricane Katrina in the New Orleans. Interior paints in homes for basements, bathrooms and kitchens, in hotel rooms, school buildings and hospital environments are being formulated with mildewcides that are not environmentally friendly or have issues of handling safety and causing sensitizing reactions.

Use of environmentally friendly chemicals in the industry is gaining significance in the current environment of "green" chemistry and sustainability. Surfactants are key ingredients of many formulations in various applications.

Paints and inks are two different categories of products. For example, desktop inkjet printers, as used in offices or at home, tend to use aqueous inks based on a mixture of water, glycol and dyes or pigments. These inks are inexpensive to manufacture, but are difficult to control on the surface of media, often requiring specially coated media. Some desktop inks contain sulfonated polyazo black dye (commonly used for dying leather), nitrates and other compounds. Aqueous inks are mainly used in printers with thermal inkjet heads, as these heads require water to perform. While aqueous inks often provide the broadest color gamut and most vivid color, most are not waterproof without specialized coating or lamination after printing. Most Dye-based inks, while usually the least expensive, are subject to rapid fading when exposed to light. Pigment-based aqueous inks are typically more costly but provide much better long-term durability and ultraviolet resistance. Inks marketed as "Archival Quality" are usually pigment-based.

Surfactants can be classified according to the nature of the charge on individual polar moiety. Anionic surfactants are negatively charged usually due to a sulphonate or sulphur group. Non-ionic surfactants lack ionic constituent and the majority of all non-ionics are polymerization products of 1,2-epoxyethane. Cationic surfactants are characterized by a quaternary ammonium group which is positively charged. Lastly, amphoteric surfactants have both positively and negatively charged moieties in the same molecule. Biosurfactants can also be grouped into two categories namely, (1) low-molecular-mass molecules with lower surface and interfacial tensions and (2) high-molecular-mass polymers which bind tightly to surfaces. Examples of low-molecular-mass molecules are rhamnolipids and sophorolipids. Examples of high molecular-mass polymers are food emulsifiers and biodispersants.

SUMMARY OF THE INVENTION

This invention uses Rhamnolipids and/or Sophorolipids for dual purposes of providing environment friendly surfactants and antimicrobial properties for the paints and coatings industry. Rhamnolipid and/or Sophorolipid biosurfactants have the dual functioning features of being 'green' surfactants and antimicrobial so they are advantageous for coatings or paints.

This invention provides processes using biosurfactants to produce emulsion polymers and the resulting emulsion polymer products.

Particularly, the invention is directed to the use of biosurfactants for synthesis of latex binders, paints and coatings. The biosurfactants may be nonionic or anionic.

In accordance with the invention, aqueous coating compositions (e.g. latex paints) including a biosurfactant are stable.

The biosurfactants can be employed in a number of ways in compositions and methods for improving paints and coatings containing latex binder.

The present invention may employ biosurfactants as a surfactant (emulsifier) during emulsion polymerization to form the latex polymer. The present invention may employ a biosurfactant as an additive to a latex polymer-containing aqueous dispersion.

The aqueous coating compositions of the invention include the biosurfactant and at least one latex polymer. The at least one latex polymer in the aqueous coating composition can be a pure acrylic, a styrene acrylic, a vinyl acrylic or an acrylated ethylene vinyl acetate copolymer and is more preferably a pure acrylic. The at least one latex polymer is preferably derived from at least one acrylic monomer selected from the group consisting of acrylic acid, acrylic acid esters, methacrylic acid, and methacrylic acid esters. For example, the at least one latex polymer can be a butyl acrylate/methyl methacrylate copolymer or a 2-ethylhexyl acrylate/methyl methacrylate copolymer. Typically, the at least one latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Latex paint formulations typically comprise additives, e.g., at least one pigment. In a preferred embodiment of the invention, the at least one pigment includes at least one pigment selected from the group consisting of $TiO_2$, $CaCO_3$, clay, aluminum oxide, silicon dioxide, magnesium oxide, sodium oxide, potassium oxide, talc, barytes, zinc oxide, zinc sulfite and mixtures thereof. More preferably, the at least one pigment includes $TiO_2$, calcium carbonate or clay.

In addition to the above components, the aqueous coating composition can include one or more additives selected from the group consisting of dispersants, surfactants, rheology modifiers, defoamers, thickeners, additional biocides, additional mildewcides, colorants, waxes, perfumes and co-solvents.

In one aspect, described herein are coating or paint compositions which contains at least one latex formed from a composition containing at least the biocide emulsifier (itself or as part of an emulsifier blend).

The present invention includes a method of preparing an aqueous coating composition using the biosurfactant as an emulsifier or part of an emulsifier blend. In an embodiment the biosurfactant is used as an emulsifier during the emulsion polymerization reaction used to make latex polymer. The method comprises preparing the polymer latex binder using emulsion polymerization by feeding latex monomers to a reactor in the presence of at least one initiator and the at least one biosurfactant (emulsifier) compound as described above and polymerizing the latex monomers to produce the latex binder comprising a blend of latex polymer and biosurfactant. The at least one pigment and other additives can then be mixed with the resulting latex binder to produce the aqueous coating composition. The step of preparing the polymer latex binder can include preparing an initiator solution comprising the initiator, preparing a monomer pre-emulsion comprising monomers and the biosurfactant (emulsifier) compound and optional additional surfactants as co-emulsifers as part of an emulsifier blend, adding the initiator solution to a reactor, and adding the monomer pre-emulsion to the reactor.

When employing biosurfactant and optional additional surfactant as an emulsifier or as an emulsifier blend in emulsion polymerization to form the latex polymer, the latex polymer is prepared from a composition wherein the total of the biosurfactant emulsifier or emulsifier blend (containing the biosurfactant emulsifier and one or more additional surfactants) is 0.5 to 10, preferably 1 to 8, or 2 to 6, or 1.5 to 3 parts per 100 parts by weight of monomers used to form the latex polymer of the binder. For example, the pre-emulsion is typically made of from 0.5% to 6% by weight of total emulsifier or emulsifier blend with respect to the total weight of monomer used to make the latex polymer of the binder. Generally more than one surfactant, for example a nonionic surfactant and an anionic surfactant, are used in emulsion polymerization. In this case the biosurfactant would be the non-ionic surfactant. In one embodiment, the emulsifier blend comprises the biosurfactant and at least one anionic surfactant. In another embodiment, the emulsifier blend comprises the biosurfactant, at least one anionic surfactant and at least one non-ionic surfactant. Typically at least 1 wt. %, or at least 2 wt. %, or at least 4 wt %, or at least 5 wt. %, more typically at least 10 wt. %, or at least 15 wt. %, still more typically at least 20 wt. %, or at least 30 wt %, or at least 50 wt % of the emulsifier blend employed in the emulsion polymerization is at least one biosurfactant selected from the group consisting of Rhamnolipid and Sophorolipid.

Suitable anionic emulsifiers include alkali metal alkyl aryl sulfonates, alkali metal alkyl sulfates and sulfonated alkyl esters. Specific examples include sodium dodecylbenzenesulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate. Suitable nonionic emulsifiers include, for example, common structures based on polyethylene oxide or oligosaccharides hydrophilic heads.

The incorporation of the biosurfactant (emulsifier) compound in the reaction mixture enables the coating composition to have a lower VOC content while maintaining the stability of the aqueous coating composition at desirable levels and have biocide and mildewcide properties.

Thus, the biocide and/or mildewcide effective amount of the biosurfactant is added to a base aqueous latex polymer dispersion prior to the base aqueous latex dispersion being formulated to be an aqueous coating composition.

In another embodiment the above-described biosurfactant is used as an additive to already formed aqueous latex polymer dispersion or during formulation of a paint or coating composition. (Formulation is the stage at which additives are added to a base aqueous latex polymer dispersion to make it into a final paint or coating product.) In other words, the biocide and/or mildewcide effective amount of the biosurfactant is added to a formulated aqueous coating composition comprising the latex polymer and water. This results in a composition comprising the biosurfactant and the latex polymer. When the biosurfactant is employed as an additive to an already formed latex polymer dispersion, the resulting composition has biosurfactant in an amount of about 0.001 to 10, for example 0.01 to 10, 0.01 to 2, 0.1 to 2, or 0.1 to 0.6, parts per 100 parts by weight of latex polymer dispersion or total weight of coating composition (on a total composition including water basis). Typically the added amount of biosurfactant is below 1 wt. % of the composition (below 10000 ppm of composition).

If desired the biosurfactant and another surfactant may be employed as an additive to an already formed latex polymer dispersion.

In this embodiment the at least one biosurfactant compound selected from the group consisting of rhamnolipids and sophorolipids is added to an already formed latex polymer dispersion to produce the latex binder. Then at least one pigment and other additives can be mixed with the resulting latex binder to produce the paint or aqueous coating composition. Addition of the biosurfactant compound to the latex polymer forms a mixture having a lower VOC content, desirable stability, and biocide and mildewcide properties.

In another embodiment the above-described biosurfactant is used as an additive during formulation of paint or an aqueous coating composition. When the biosurfactant is employed as an additive during formulation of paint or aqueous composition, e.g., aqueous latex polymer dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10000 ppm of composition).

This method comprises adding the at least one biosurfactant selected from the group consisting of rhamnolipids and sophorolipids as a biocide during formulation of aqueous latex paints or aqueous coating compositions to produce the final paint or aqueous coating compositions. The at least one pigment and other additives can be mixed before or after the biosurfactant to produce the paint or aqueous coating composition. The addition of the biosurfactant during formulation of latex paint or aqueous coating composition maintains the stability of the aqueous coating composition at desirable levels and provides biocide and mildewcide properties.

When used in compositions and methods of the present invention the biosurfactant selected from the group consisting of rhamnolipid and/or sophorolipid can be the sole biocide or employed as a potentiator in combination with another biocide other than a rhamnolipid and/or sophorolipid where the resultant combination has an enhanced biocidal efficiency.

Compositions of the present invention may have an absence of biopolymers, for example an absence of dextran.

Compositions of the present invention may have an absence of polyvinylalcohol based block copolymer such as those in the abstract of U.S. Pat. No. 7,348,382 B2 to Ueno.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

Figure 1:
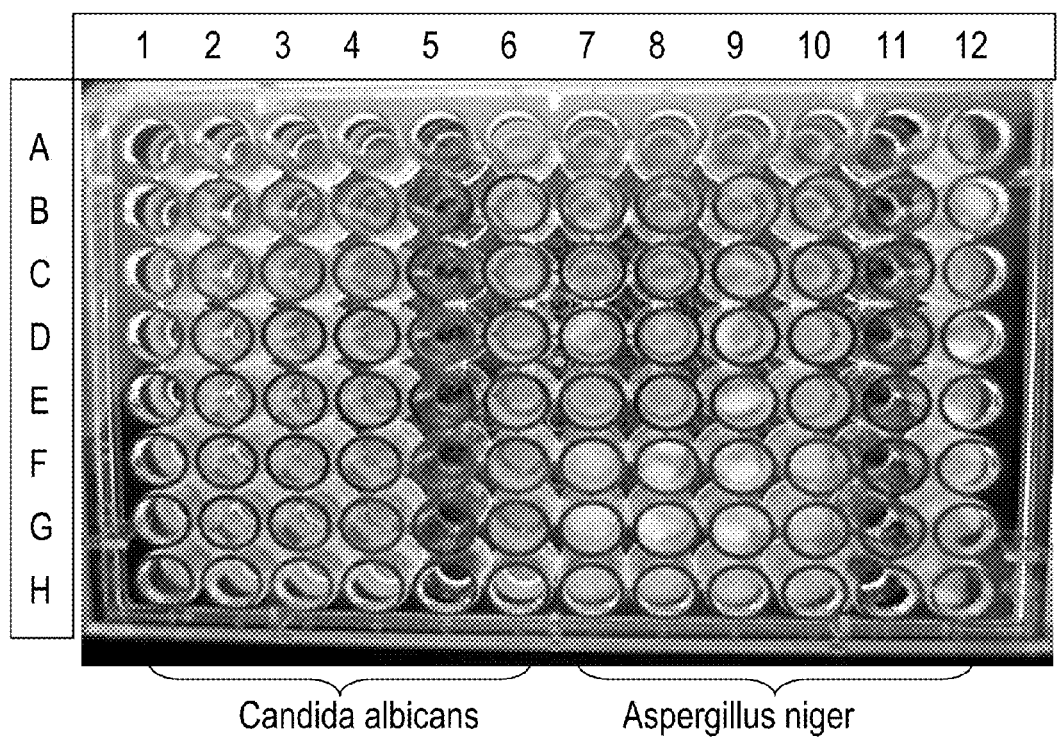
FIG. 1 shows the microtiter plate employed in Example 1.

The present invention relates to the use of a particular family of biosurfactants for latex dispersions, binders, paints and coatings. The present invention provides aqueous compositions, for example, aqueous coating compositions, with low-VOC content comparable to conventional aqueous coating compositions and beneficial biocide and mildewcide properties. The aqueous compositions of the invention are aqueous polymer dispersions which include at least one latex polymer copolymerized or blended with a particular family of biosurfactants, e.g., rhamnolipids. Paints or other aqueous coatings of the present invention typically further include at least one pigment. Typically the latex has a Tg of less than 10° C., more typically less than 5° C., still more typically in the range from 5 to −10° C., e.g., 0° C.

The members of the particular family of biosurfactants can be employed in a number of ways for improving latex aqueous dispersions, binders, coatings and paints. The present invention may employ biosurfactants as (1) a surfactant (emulsifier) to be present during latex polymer formation, and/or (2) an additive to aqueous dispersions, binders, coatings or paints comprising latex polymer or copolymer.

As used herein, the term "alkyl" means a monovalent straight or branched saturated hydrocarbon radical, more typically, a monovalent straight or branched saturated ($C_1$-$C_{40}$) hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tertacontyl.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "alkoxyalkyl" means an alkyl radical that is substituted with one or more alkoxy substituents, more typically a ($C_1$-$C_{22}$)alkyloxy-($C_1$-$C_6$)alkyl radical, such as methoxymethyl, and ethoxybutyl.

As used herein, the term "alkenyl" means an unsaturated straight or branched hydrocarbon radical, more typically an unsaturated straight, branched, ($C_2$-$C_{22}$) hydrocarbon radical, that contains one or more carbon-carbon double bonds, such as, for example, ethenyl, n-propenyl, iso-propenyl.

As used herein, terms "aqueous medium" and "aqueous media" are used herein to refer to any liquid medium of which water is a major component. Thus, the term includes water per se as well as aqueous solutions and dispersions.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkoxyl, alkenyl, halo, haloalkyl, monocyclic aryl, or amino, such as, for example, phenyl, methylphenyl, methoxyphenyl, dimethylphenyl, trimethylphenyl, chlorophenyl, trichloromethylphenyl, triisobutyl phenyl, tristyrylphenyl, and aminophenyl.

As used herein, the term "aralkyl" means an alkyl group substituted with one or more aryl groups, more typically a ($C_1$-$C_{18}$)alkyl substituted with one or more ($C_6$-$C_{14}$)aryl substituents, such as, for example, phenylmethyl, phenylethyl, and triphenylmethyl.

As used herein, the term "aryloxy" means an oxy radical substituted with an aryl group, such as for example, phenyloxy, methylphenyl oxy, isopropylmethylphenyloxy.

The term "biopolymer" includes polysaccharides, for example dextran, proteins and polyesters and combinations thereof.

As used herein, the terminology "($C_x$-$C_y$)" in reference to an organic group, wherein x and y are each integers, indicates the group may contain from x carbon atoms to y carbon atoms per group.

As used herein, the term "cycloalkenyl" means an unsaturated hydrocarbon radical, typically an unsaturated ($C_5$-$C_{22}$) hydrocarbon radical, that contains one or more cyclic alkenyl rings and which may optionally be substituted on one or more carbon atoms of the ring with one or two ($C_1$-$C_6$)alkyl groups per carbon atom, such as cyclohexenyl, cycloheptenyl, and "bicycloalkenyl" means a cycloalkenyl ring system that comprises two condensed rings, such as bicycloheptenyl.

As used herein, the term "cycloalkyl" means a saturated hydrocarbon radical, more typically a saturated ($C_5$-$C_{22}$) hydrocarbon radical, that includes one or more cyclic alkyl rings, which may optionally be substituted on one or more carbon atoms of the ring with one or two ($C_1$-$C_6$)alkyl groups per carbon atom, such as, for example, cyclopentyl, cycloheptyl, cyclooctyl, and "bicyloalkyl" means a cycloalkyl ring system that comprises two condensed rings, such as bicycloheptyl.

As used herein, an indication that a composition is "free" of a specific material means the composition contains no measurable amount of that material.

As used herein, the term "heterocyclic" means a saturated or unsaturated organic radical that comprises a ring or condensed ring system, typically comprising from 4 to 16 ring atoms per ring or ring system, wherein such ring atoms comprise carbon atoms and at least one heteroatom, such as for example, O, N, S, or P per ring or ring system, which may optionally be substituted on one or more of the ring atoms, such as, for example, thiophenyl, benzothiophenyl, thianthrenyl, pyranyl, benzofuranyl, xanthenyl, pyrolidinyl, pyrrolyl, pyradinyl, pyrazinyl, pyrimadinyl, pyridazinyl, indolyl, quinonyl, carbazolyl, phenathrolinyl, thiazolyl, oxazolyl, phenoxazinyl, or phosphabenzenyl.

As used herein, the term "hydroxyalkyl" means an alkyl radical, more typically a ($C_1$-$C_{22}$)alkyl radical, that is substituted with one or more hydroxyl groups, such as for example, hydroxymethyl, hydroxyethyl, hydroxypropyl, and hydroxydecyl.

As used herein the term "(meth)acrylate" refers collectively and alternatively to the acrylate and methacrylate and the term "(meth)acrylamide" refers collectively and alternatively to the acrylamide and methacrylamide, so that, for example, "butyl(meth)acrylate" means butyl acrylate and/or butyl methacrylate.

As used herein, "molecular weight" in reference to a polymer or any portion thereof, means to the weight-average molecular weight ("$M_w$") of said polymer or portion, wherein $M_w$ of a polymer is a value measured by gel permeation chromatography with an aqueous eluent or an organic eluent (for example dimethylacetamide, dimethylformamide, and the like), depending on the composition of the polymer, light scattering (DLS or alternatively MALLS), viscometry, or a number of other standard techniques and $M_w$ of a portion of a polymer is a value calculated according to known techniques from the amounts of monomers, polymers, initiators and/or transfer agents used to make the said portion.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, an indication that a composition is "substantially free" of a specific material, means the composition contains no more than an insubstantial amount of that material, and an "insubstantial amount" means an amount that does not measurably affect the desired properties of the composition.

As used herein, the term "surfactant" means a compound that reduces surface tension when dissolved in water.

"Anti-microbial effective amount" means the amount of antimicrobial ingredient, that as a whole, provides an antimicrobial (including, for example, biocide, mildewcide, antiviral, antibacterial, or antifungal) activity that reduces, prevents, or eliminates one or more species of microbes, such that an acceptable level of the microbe results.

"Surfactant effective amount" means the amount of the surfactant that provides a surfactant effect to enhance the stability of emulsions of the polymers.

"Antimicrobial paint" refers to a paint comprising an antimicrobial effective amount of antimicrobial ingredient having the ability to inhibit or irreversibly prevent the growth of a microorganism.

The term "architectural coating" as used herein is intended to encompass a mixture of resin, optionally pigment, and a suitable liquid vehicle that is reasonably fluid and provides a thin and adherent layer when applied to a substrate. As such, the term "architectural coating" is intended to encompass paints, lacquers, varnishes, base coats, clear coats, primers and the like.

Paints that dry by solvent evaporation and contain a solid binder dissolved in a solvent are known as lacquers. A solid film forms when the solvent evaporates, and because the film can re-dissolve in solvent, lacquers are unsuitable for applications where chemical resistance is important.

Latex paint is a water-borne dispersion of sub-micrometer polymer particles. The term "latex" in the context of paint simply means an aqueous dispersion; latex rubber (the sap of the rubber tree that has historically been called latex) is not an ingredient. These dispersions are prepared by emulsion polymerization. Latex paints cure by a process called coalescence where first the water, and then the trace, or coalescing, solvent, evaporate and draw together and soften the latex binder particles and fuse them together into irreversibly bound networked structures, so that the paint will not redissolve in the solvent/water that originally carried it. The residual surfactants in paint as well as hydrolytic effects with some polymers cause the paint to remain susceptible to softening and, over time, degradation by water.

Emulsion Polymerization

In a first embodiment, the rhamnolipid and/or sophorose lipid (also known as sophorolipid) biosurfactant is used as an emulsifier during the emulsion polymerization reaction used to make latex polymer.

Emulsion polymerization is discussed in G. Pohlein, "Emulsion Polymerization", Encyclopedia of Polymer Science and Engineering, vol. 6, pp. 1-51 (John Wiley & Sons, Inc., NY, N.Y., 1986), the disclosure of which is incorporated herein by reference. Emulsion polymerization is a heterogeneous reaction process in which unsaturated monomers or monomer solutions are dispersed in a continuous phase with the aid of an emulsifier system and polymerized with free-radical or redox initiators. The product, a colloidal dispersion of the polymer or polymer solution, is called a latex.

The monomers typically employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. This is further discussed below in the section entitled "Latex Monomers".

In the above process, suitable initiators, reducing agents, catalysts and surfactants are well known in the art of emulsion polymerization. Typical initiators include ammonium persulfate (APS), hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like and mixtures thereof. Commonly used redox initiation systems are described e.g., by A. S. Sarac in Progress in Polymer Science 24 (1999), 1149-1204.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above-described reducing agents, promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

Emulsion polymerization occurs in the presence of an emulsifier. The biosurfactant monomer is added as emulsifier in an effective amount to enhance the stability of emulsions of the polymers with or without additional emulsifier. The rhamnolipid and/or sophorose lipid (also known as sophorolipid) biosurfactant may be the sole emulsifier or it may be employed with an additional emulsifier (co-emulsifier) other than the rhamnolipid and/or sophorose lipid biosurfactant.

When employing biosurfactant and optional additional surfactant as an emulsifier or as an emulsifier blend in emulsion polymerization to form the latex polymer, the latex polymer is prepared from a composition wherein the total of the biosurfactant emulsifier or emulsifier blend (containing the biosurfactant emulsifier and one or more additional surfactants) is 0.5 to 10, preferably 1 to 8, or 2 to 6, or 1.5 to 3 parts per 100 parts by weight of monomers used to form the latex polymer of the binder. For example, the pre-emulsion is typically made of from 0.5% to 6% by weight of total emulsifier or emulsifier blend with respect to the total weight of monomer used to make the latex polymer of the binder. Generally more than one surfactant, for example a nonionic surfactant and an anionic surfactant, are used in emulsion polymerization. In this case the biosurfactant would be the non-ionic surfactant. In one embodiment, the emulsifier blend comprises the biosurfactant and at least one anionic surfactant. In another embodiment, the emulsifier blend comprises the biosurfactant, at least one anionic surfactant and at least one non-ionic surfactant. Typically at least 1 wt. %, or at least 2 wt. %, or at least 4 wt %, or at least 5 wt. %, more typically at least 10 wt. %, or at least 15 wt. %, still more typically at least 20 wt. %, or at least 30 wt %, or at least 50 wt % of the emulsifier blend employed in the emulsion polymerization is at least one biosurfactant selected from the group consisting of Rhamnolipid and Sophorolipid.

Typical optional additional emulsifiers are ionic or non-ionic surfactants that are polymerizable or non-polymerizable during polymerization. Suitable ionic and nonionic surfactants are alkyl polyglycol ethers such as ethoxylation products of lauryl, tridecyl, oleyl, and stearyl alcohols; alkyl phenol polyglycol ethers such as ethoxylation products of octyl- or nonylphenol, diisopropyl phenol, triisopropyl phenol; alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

In one embodiment, anionic emulsifiers include alkali metal alkyl aryl sulfonates, alkali metal alkyl sulfates and sulfonated alkyl esters. Specific examples include sodium dodecylbenzenesulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate. In a further embodiment, nonionic emulsifiers include, for example, common structures based on polyethylene oxide or oligosaccharides hydrophilic heads.

The polymer latex or polymer latex binder can be produced by first preparing an initiator solution comprising the initiator and water. A monomer pre-emulsion is also prepared comprising at least a portion of the one or more surfactants, monomers, water and additional additives such as NaOH, chain transfer agent, etc. The one or more surfactants in the monomer pre-emulsion include the biosurfactant and above-described optional additional surfactant.

Thus, a typical process of emulsion polymerization preferably involves charging water to a reactor and feeding as separate streams a pre-emulsion of the monomer and a solution of the initiator. In particular, the polymer latex binder can be prepared using emulsion polymerization by feeding the monomers used to form the latex binder to a reactor in the presence of at least one initiator and at least one biosurfactant and polymerizing the monomers to produce the latex binder. Typically the initiator solution and monomer pre-emulsion are continuously added to the reactor over a predetermined period of time (e.g. 1.5-5 hours) to cause polymerization of latex monomers to produce the latex polymer.

Prior to the addition of the initiator solution and the monomer pre-emulsion, a seed latex such as a polystyrene seed latex can be added to the reactor. For example, a small amount of the pre-emulsion and a portion of the initiator may be charged initially at the reaction temperature to produce "seed" latex. The "seed" latex procedure results in better particle-size reproducibility.

Thus, the typical emulsion polymerizing comprises the following sequential steps:
a) forming a stable aqueous pre-emulsion from a monomer and the biosurfactant,
b) forming said reaction mixture comprising the pre-emulsion, an initiator, and water
c) introducing the reaction mixture into a reactor and adding from 1 to 10% by weight of said pre-emulsion into said reaction mixture, and
d) heating said reaction mixture obtained at the end of step c) to a temperature of between 40° C. and 90° C. to generate a seed formed of latex particles in dispersion in the water.

If desired, the emulsion polymerizing further comprises:
e) reacting the seed formed of latex particles in dispersion in the water obtained in step d) with an additional amount of initiator to produce latex, and
f) optionally, heating the latex obtained in step e) at a temperature of between 40° C. and 90° C.

Under "normal" initiation conditions, that is initiation conditions under which the initiator is activated by heat, the polymerization is normally carried out at about 60-90° C. A typical "normal" initiated process, for example, could employ ammonium persulfate as initiator at a reaction temperature of 80+/−2° C. Under "redox" initiation conditions, namely initiation conditions under which the initiator is activated by a reducing agent, the polymerization is normally carried out at 60-70° C. Normally, the reducing agent is added as a separate solution. A typical "redox" initiated process, for example, could employ potassium persulfate as the initiator and sodium metabisulfite as the reducing agent at a reaction temperature of 65+/−2° C.

The reactor is operated at desired reaction temperature at least until all the monomers are fed to produce the polymer latex binder. Once the polymer latex binder is prepared, it is preferably chemically stripped thereby decreasing its residual monomer content. Preferably, it is chemically stripped by continuously adding an oxidant such as a peroxide (e.g. t-butylhydroperoxide) and a reducing agent (e.g. sodium acetone bisulfite), or another redox pair such as those described by A. S. Sarac in Progress in Polymer Science 24(1999), 1149-1204, to the latex binder at an elevated temperature and for a predetermined period of time (e.g. 0.5 hours). The pH of the latex binder can then be adjusted and other additives added after the chemical stripping step.

In the above emulsions, the polymer preferably exists as a generally spherical particle, dispersed in water, with a diameter of about 50 nanometers to about 500 nanometers.

The monomers fed to a reactor to prepare the polymer latex binder preferably include at least one acrylic monomer selected from the group consisting of acrylic acid, acrylic acid esters, methacrylic acid, and methacrylic acid esters. In addition, the monomers can include styrene, vinyl acetate, or ethylene. The monomers can also include one or more monomers selected from the group consisting of styrene, (alpha)-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, and ethylene. It is also possible to include C4-C8 conjugated dienes such as 1,3-butadiene, isoprene or chloroprene. Preferably, the monomers include one or more monomers selected from the group consisting of n-butyl acrylate, methyl methacrylate, styrene, and 2-ethylhexyl acrylate.

Commonly used monomers in making acrylic paints are butyl acrylate, methyl methacrylate, ethyl acrylate and the like. In acrylic paint compositions the polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

Typically, the monomer comprises at least one first monomer selected from the group consisting of acrylic acid, acrylic acid esters, methacrylic acid, methacrylic acid esters, styrene, vinyl toluene, vinyl acetate, vinyl esters of higher carboxylic acids than acetic acid, vinyl versatate, acrylonitrile, acrylamide, butadiene, ethylene, vinyl chloride and mixtures thereof.

Typically, the latex polymer is selected from the group consisting of pure acrylics, styrene acrylics, vinyl acrylics, acrylated ethylene vinyl acetate copolymers, and a butyl acrylate/methyl methacrylate copolymer.

Also typically the latex polymer may be further derived from one or more second monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

The incorporation of the Rhamnolipid or Sophorolipid biosurfactant (emulsifier) in the emulsion polymerization reaction mixture enables the coating composition to maintain stability at desirable levels and act as a biocide and mildewcide.

Rhamnolipids:

Rhamnolipid biosurfactants are surface active compounds released by microorganisms. They are biodegradable non-toxic and eco-friendly materials. Their production depends on the fermentation conditions, environmental factors and nutrient availability. Biosurfactants are extracted from cell-free supernatant using the solvent extraction procedure.

*Pseudomonas aeruginosa* DS10-129 was used to produce rhamnolipid (Rahman et al., 2002a, b, 2003). Rhamnolipid may also be produced from *Pseudomonas* sp., *Serratia rubidea* according to Pattanathu, Production, Characterisation and Applications of Biosurfactants-Review, Biotechnology 7 (2): 360-370, 2008, ISSN 1682-296X (2008) Asian Network for Scientific Information.

Rhamnolipid bio-surfactant secreted from *Pseudomonas aeruginosa* is a naturally occurring extracellular glycolipid found in the soil and on plants. Rhamnolipids bio-surfactants provide antibacterial and antifungal activity, and low toxicity levels.

Rhamnolipids have been used in the medical field to combat certain types of bacteria, viruses, and fungi. US 2011/0270207 A1 to DeSanto discloses rhamnolipid-based formulations to clean, disinfect, deodorize, and act as an antimicrobial and antifungal agent for living and working environments. In addition, it discloses the use of rhamnolipids to create a bio-film when applied to a surface, which prevents the growth of bacteria and fungus. This technique is asserted to be useful to create clean surface areas for medical procedures, chemical testing, during food preparation, and for daycare centers and hospitals. Rhamnolipid biosurfactants produced by *Pseudomonas aeruginosa* DS10-129 showed significant applications in the bioremediation of hydrocarbons in gasoline-spilled soil and petroleum oily sludge. Rhamnolipid biosurfactant enhanced the bioremediation process by releasing the weathered oil from the soil matrices and enhanced the bioavailability of hydrocarbons for microbial degradation. It is having potential applications in the remediation of hydrocarbon contaminated sites. The biosurfactant Rhamnolipid is an EPA registered product for use as a bio-fungicide for agricultural use.

Bacteria of the genus *Pseudomonas* are known to produce glycolipid surfactant containing rhamnose and 3-hydroxy fatty acids (Lang and Wullbrandt, 1999; Rahman et al., 2002b). Rhamnolipids produced by *Pseudomonas aeruginosa* have been widely studied and reported as a mixture of homologous species RL1 ($RhC_{10}C_{10}$,), RL2 ($RhC_{10}$,), RL3 ($Rh_2C_{10}C_{10}$) and RL4 ($Rh_2C_{10}$) (Syldatk and Wagner, 1987; Lang and Wagner, 1987; Rahman et al., 2002b). Using virgin olive oil (Healy et al., 1996), a rhamnolipid was produced by *Pseudomonas fluorescens* NCIMB 11712 that is a methyl pentose monosaccharide. Disaccharide rhamnolipids are formed by condensing two moles of rhamnose sugar and an acetal group links the hydrophobic group. However, the lipid part of the molecule contains ester and carboxyl groups. Rhamnolipids produced by *Pseudomonas aeruginosa* strains are among the most effective surfactants when applied for the removal of hydrophobic compounds from contaminated soils (Rahman et al., 2006). They posses low average minimum surface tension of (30-32 mN m$^{-1}$; high average emulsifying activity of (10.4-15.5 U mL$^{-1}$ filtrate), low critical micelle concentration (CMC) (5-65 mg L$^{-1}$) and high affinity for hydrophobic organic molecules (Van Dyke et al., 1993).

Structural formula I shows the structure of a typical mono-rhamnolipid, RLL or R1 (alpha-L-Rhamnopyranosyl-beta-hydroxydecanoyl-beta-hydrooxydecanoate, C26H48O9 (504 g/mol).

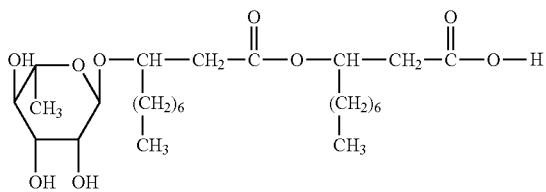

I.

Structure II shows a structure of a typical di-rhamnolipid, RRLL or R2 (2-O-alpha-L-Rhamnopyranosyl-alpha-L-thamnopyranosyl-beta-hydroxydecanoyl-beta-hydrooxydecanoate, C32H58O13 (650 g/mol):

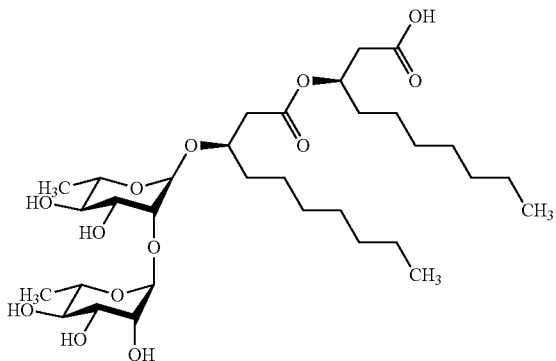

II.

As mentioned above, there are two major groups of rhamnolipids; mono-rhamnolipids and di-rhamnolipids.

Mono-rhamnolipids have a single rhamnose sugar ring. The basic formula (which is most often produced by *P. aeruginosa*) is: L-rhamnosyl-beta-hydroxydecanoyl-beta-hydroxydecanoate (often referred to as Rha-$C_{10}$-$C_{10}$) with a formula of $C_{26}H_{48}O_9$ The IUPAC Name is 3-[3-[(2R,3R,4R,5R,6S)-3,4,5-trihydroxy-6-methyloxan-2-yl]oxydecanoyloxy]decanoic acid Di-rhamnolipids have two rhamnose sugar rings. The basic formula is: L-rhamnosyl-L-rhamnosyl-beta-hydroxydecanoyl-beta-hydroxydecanoate (often referred to as Rha-Rha-$C_{10}$-$C_{10}$) with a formula of $C_{32}H_{58}O_{13}$ The IUPAC Name is: 3-[3-[4,5-dihydroxy-6-methyl-3-(3,4,5-trihydroxy-6-methyloxan-2-yl)oxyoxan-2-yl]oxydecanoyloxy]decanoic acid Some other forms or names for the more common di-rhamnolipids include:
L-rhamnopyranosyl-L-rhamnopyranosyl-beta-hydroxydecanoyl-beta-hydroxydecanoate (often referred to as Rha-Rha-$C_{10}$-$C_{10}$)
L-rhamnopyranosyl-L-rhamnopyranosyl-beta-hydroxydecanoyl-beta-hydroxydodecanoate (often referred to as Rha-Rha-$C_{10}$-$C_{12}$)
L-rhamnopyranosyl-L-rhamnopyranosyl-beta-hydroxytetradecanoyl-beta-hydroxytetradecanoate (often referred to as Rha-Rha-$C_{14}$-$C_{14}$)

Other more specific naming conventions for rhamnolipids include:
Decanoic acid, 3-[[6-deoxy-2-O-(6-deoxy-alpha-L-mannopyranosyl)-alpha-L-mannopyranosyl]oxy]-, 1-(carboxymethyl)octyl ester, 1-(carboxymethyl)octyl 3-[(6-deoxy-alpha-L-mannopyranosyl)oxy]decanoate, 3-[3'-(L-rhamnopyranosyloxy)decanoyloxy]decanoic acid 3-[3'-(2"-O-α-L-rhamnopyranosyl-α-L-rhamnopyranosyloxy)decanoyloxy]decanoic acid Rhamnolipids have been found with combinations of the following fatty acids:
Hydroxyoctanoyl=$C_8$
Hydroxydecanoyl=$C_{10}$ Hydroxydecanate=$C_{10}$
Hydroxydodecanoyl=$C_{12}$ Hydroxydodecanate=$C_{12}$
Hydroxytetradecanoyl=$C_{14}$ Hydroxytetradecanate=$C_{14}$ A compound where the total carbon count is the same, but the $C_{10}$-$C_{12}$ is switched to $C_{12}$-$C_{10}$ is called a structural isomer, meaning the formula is the same for both molecules, but the bonds or links are connected differently.

In various papers instead of mono-rhamnolipid as Rha-, it may be abbreviated as Rh or RL2. Similarly, instead of Rha-Rha- designating a di-rhamnolipid, Rh-Rh- or RL1 is used. For historical reasons "rhamnolipid 2" is a mono-rhamnolipid and "rhamnolipid 1" is a di-rhamnolipid. This actually leads to some ambiguity in the usage or "RL1" and "RL2" in the literature. For purposes of the present specification "rhamnolipid 1" or "RL1" is a mono-rhamnolipid and "rhamnolipid 2" or "RL2" is a di-rhamnolipid.

In various studies the following rhamnolipids have been detected as produced by the following bacteria: ($C_{12:1}$, $C_{14:1}$ indicate fatty acyl chains with double bonds.)

Rhamnolipids produced by *P. aeruginosa* (mono-rhamnolipids):
Rha-$C_8$-$C_{10}$, Rha-$C_{10}$-$C_8$, Rha-$C_{10}$-$C_{10}$, Rha-$C_{10}$-$C_{12}$, Rha-$C_{10}$-$C_{12:1}$, Rha-$C_{12}$-$C_{10}$, Rha-$C_{12:1}$-$C_{10}$ Rhamnolipids produced by *P. aeruginosa* (di-rhamnolipids):
Rha-Rha-$C_8$-$C_{10}$, Rha-Rha-$C_8$-$C_{12:1}$, Rha-Rha-$C_{10}$-$C_8$, Rha-Rha-$C_{10}$-$C_{10}$, Rha-Rha-$C_{10}$-$C_{12:1}$, Rha-Rha-$C_{10}$-$C_{12}$, Rha-Rha-$C_{12}$-$C_{10}$, Rha-Rha-$C_{12:1}$-$C_{12}$, Rha-Rha-$C_{10}$-$C_{14:1}$ Rhamnolipids produced by *P. aeruginosa* (unidentified as either mono- or di-rhamnolipids):
$C_8$-$C_8$, $C_8$-$C_{10}$, $C_{10}$-$C_8$, $C_8$-$C_{12:1}$, $C_{12:1}$-$C_8$, $C_{10}$-$C_{10}$, $C_{12}$-$C_{10}$, $C_{12:1}$-$C_{10}$, $C_{12}$-$C_{12}$, $C_{12:1}$-$C_{12}$, $C_{14}$-$C_{10}$, $C_{14:1}$-$C_{10}$, $C_{14}$-$C_{14}$.

Rhamnolipids produced by *P. chlororaphis* (mono-rhamnolipids only):
Rha-$C_{10}$-$C_8$, Rha-$C_{10}$-$C_{10}$, Rha-$C_{12}$-$C_{10}$, Rha-$C_{12:1}$-$C_{10}$, Rha-$C_{12}$-$C_{12}$, Rha-$C_{12:1}$-$C_{12}$, Rha-$C_{14}$-$C_{10}$, Rha-$C_{14:1}$-$C_{10}$ Rhamnolipids produced by *Burkholdera pseudomallei* (di-rhamnolipids only):
Rha-Rha-$C_{14}$-$C_{14}$ Rhamnolipids produced by *Burkholdera* (*Pseudomonas*) *plantarii* (di-rhamnolipids only):
Rha-Rha-$C_{14}$-$C_{14}$ The rhamnolipids formulations for use as emulsifiers or additives in the present invention may be crude or highly purified rhamnolipids. A crude rhamnolipid formulation contains a rhamnolipid, having many impurities both external impurities, and/or a variety of various Rhamnolipid mixtures, which causes a reduced effect on the formulation. A highly purified rhamnolipid formulation contains a rhamnolipid whose external impurities have been removed, and/or the rhamnolipids have been purified to meet certain parameters to cause an increased effect on the formulation which includes di-rhamnolipid, mono-rhamnolipid or a certain mixture of both.

The rhamnolipids formulations are made by eliminating unwanted impurities from the initial mixture and then establishing the percentage and type of rhamnolipid to be resident in the final mixture and simply diluting the rhamnolipid preparation with a carrier or diluents, preferably water or ethanol. The present invention is not limited by the use of water and ethanol as carrier or diluents. The present invention contemplates the use of any carrier or diluents, as long as it is compatible with rhamnolipid.

In general, the rhamnolipid formulation ("crude" or partially purified therefrom) is diluted to a final concentration of less than 70%, for example, about 5% to about 70%, rhamnolipid in the final rhamnolipid formulation.

In the present invention the use of the term "rhamnolipid" implies indistinctively crude or highly purified Rhamnolipids, and various mixtures of the Rhamnolipid components.

As mentioned above, Rhamnolipids are secreted from *Pseudomonas aeruginosa*. Typically, the bacterium *Pseudomonas aeruginosa* is cultured in a suitable medium and grown to a desired density. The bacteria themselves are removed from the culture media by any method known in the art, such as centrifugation. The supernatant may be used directly as the crude formulation, or further processing steps well-known to those of skilled in the art may be carried out (e.g. concentration, filtration, column chromatography, and the like). Notably, however, the final rhamnolipid formulation is not highly purified and is referred to as "crude rhamnolipid", and typically contains a mixture of both mono-rhamnolipids and di-rhamnolipids, and other compounds. Those of skill in the art will recognize the precise details of cultivation and partial purification may vary somewhat and still be within the scope of the invention.

Preparation of crude rhamnolipid formulations and highly purified rhamnolipid formulations may be prepared by methods that are well-known to those of skill in the art.

The compositions of the invention may comprise one or more types of rhamnolipids. These rhamnolipids may be a mono-rhamnolipid, a di-rhamnolipid, or a combination of the two.

Sophorolipids:

Sophorolipids (also known as sophorose lipids or SLs) are a group of biosurfactants consisting of a dimeric sugar (sophorose) and a hydroxyl fatty acid, linked by a beta-glycosidic bond (Asmer et al., 1988).

According to Hu and Ju, (2001) as well as US patent application publication no. 2011/0237531 to Yanagisawa et al. there are two types of SLs namely, the acidic (non-lactonic) SLs and the lactonic SLs. The hydroxyl fatty acid moiety of the acidic SLs has a free carboxylic acid functional group while that of the lactonic SLs forms a macrocyclic lactone ring with the 4"-hydroxyl group of the sophorose by intramolecular esterification. SLs have measurable biocide activity, while the acetylated lactonic SLs have been applied in cosmetics as antidandruff, bacteriostatic agents and deodorants.

Sophorose lipids are a type of glycolipid biosurfactants and are generally categorized into two forms: the lactone form represented by the following structural formula (III):

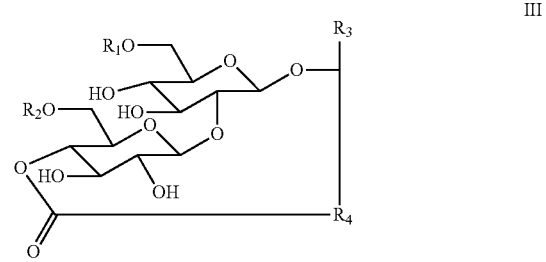

wherein R1 and R2 each represent H or COCH3; R3 represents H or CH3; and R4 represents a saturated or unsaturated C12-16 hydrocarbon group when R3 is H, and R4 represents a saturated or unsaturated C11-15 hydrocarbon group when R3 is CH3, and the acid form represented by the following formula (IV)

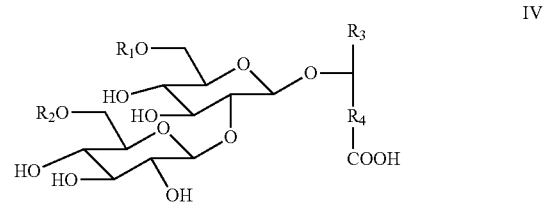

wherein R1 to R4 are as defined above.

As is clear from the above, sophorose lipids have a number of derivatives which are characterized by the positions and number of acetyl groups, the presence or absence of double bonds in the fatty acid side chain, the length of the carbon chain of the fatty acid side chain, the position of the glycosidic ether bond in the fatty acid side chain, the positions of hydroxyl groups on the sophorose moiety that is a part of a lactone ring, and other structural parameters. Sophorose lipids generally occur as a mixture of these compounds. In general, sophorose lipids are produced in a highly viscous oil form that is difficult to handle. However, sophorose lipids in the diacetyl lactone form, which are comparatively high in hydrophobicity, can be produced in a solid form.

The sophorose lipid biosurfactant according to the present invention can be produced by culturing a microorganism capable of producing a glycolipid biosurfactant. Any microorganism capable of producing a glycolipid biosurfactant can be used for the production of sophorose lipids. Sophorose lipid biosurfactant can be produced by yeasts of the genera *Candida*, for example, *Candida bombicola*, *Torulopsis*, for example, *Torulopsis apicola*, *Wickerhamiella*, and *Starmerella* according to US 2011/0237531. They can be produced by *Torulopsis* sp., *Candida apicola*, *Candida lipolytica*, *Candida bogoriensis* or *Torulopsis bombicola* according to Pattanathu, Production, Characterisation and Applications of Biosurfactants-Review, Biotechnology 7 (2): 360-370, 2008, ISSN 1682-296X (2008) Asian Network for Scientific Information.

The sophorose lipids can be produced by culturing the above-mentioned microorganism in a culture medium. For the culture process in the present invention, any medium can generally be used, provided it contains assimilable nutritional sources for yeast cells.

Latex Monomers

For purposes of this description, monomers from which latex polymers may be derived are termed "latex monomers".

Preferably, these latex monomers comprise at least one acrylic monomer selected from the group consisting of acrylic acid, acrylic acid esters, methacrylic acid, and methacrylic acid esters. In addition, the other monomers for making the latex polymer can optionally be selected from one or more monomers selected from the group consisting of styrene, a-methyl styrene, vinyl chloride, acrylonitrile, methacrylonitrile, ureido methacrylate, vinyl acetate, vinyl esters of branched tertiary monocarboxylic acids (e.g. vinyl esters commercially available under the mark VEOVA from Shell Chemical Company or sold as EXXAR neo vinyl esters by ExxonMobil Chemical Company), itaconic acid, crotonic acid, maleic acid, fumaric acid, and ethylene. It is also possible to include C4-C8 conjugated dienes such as 1,3-butadiene, isoprene and chloroprene.

Preferably, the latex monomers include one or more monomers selected from the group consisting of n-butyl acrylate, methyl methacrylate, styrene and 2-ethylhexyl acrylate. The latex polymer is typically selected from the group consisting of pure acrylics (comprising acrylic acid, methacrylic acid, an acrylate ester, and/or a methacrylate ester as the main monomers); styrene acrylics (comprising styrene and acrylic acid, methacrylic acid, an acrylate ester, and/or a methacrylate ester as the main monomers); vinyl acrylics (comprising vinyl acetate and acrylic acid, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art. In a particularly preferred embodiment, the latex polymer is a pure acrylic such as a butyl acrylate/methyl methacrylate copolymer derived from monomers including butyl acrylate and methyl methacrylate.

Additive to an Already Formed Aqueous Latex Dispersion

In another embodiment the above-described biosurfactant can be used as an additive to an already formed aqueous dispersion of latex polymer. This results in an aqueous composition comprising the biosurfactant compound and the latex polymer. The typical monomers from which the latex polymer is formed are described above in the section entitled "Emulsion Polymerization".

For example, the present invention further includes a method of preparing a latex binder composition, comprising adding the at least one biosurfactant (emulsifier) as described above to an aqueous dispersion of a latex polymer to produce the latex binder. When the biosurfactant compound is employed as an additive to an already formed aqueous latex dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10,000 ppm of composition). For example, in an embodiment the added amount of biosurfactant is 50-1000 ppm of composition. The biosurfactant may all be added during the formulation or a portion may be added during emulsification with the remainder added during formulation to arrive at the amount of biosurfactant of the resulting composition.

The at least one pigment and other additives can then be mixed with the resulting latex binder to produce the aqueous coating composition in any appropriate order. The addition of the biosurfactant to the latex polymer forms a mixture having a lower VOC content while maintaining the stability of the mixture at desirable levels and achieving a biocide and mildewcide activity.

Additive During Paint or Aqueous Coating Composition Formulation

In another embodiment the above-described biosurfactant can be used as an additive during formulation of paint or aqueous coating composition. Formulation is the stage at which additives are added to a base aqueous latex polymer dispersion to make it into final product such as a paint or coating. For example, pigment is a typical additive added during formulation of paint from raw aqueous latex polymer dispersion. When the biosurfactant compound is added during formulation to a paint or aqueous coating composition, e.g., aqueous latex coating dispersion, the resulting composition has biosurfactant in an amount of about 0.001 to 10, for example 0.01 to 2; or 0.1 to 0.6, parts per 100 parts by weight of latex polymer dispersion or total weight of coating composition (on a total composition including water basis). Typically the added amount of biosurfactant is below 1 wt. % of the composition (below 10,000 ppm of composition). For example, in an embodiment the added amount of biosurfactant is 50-1000 ppm of composition. The biosurfactant may all be added during the formulation or a portion may be added during emulsification with the remainder added during formulation to arrive at the amount of biosurfactant of the resulting composition.

The present invention further includes a method of preparing a paint or aqueous coating composition, comprising adding the biosurfactant as described above during formulation of paint or aqueous coating composition comprising at least one pigment and other additives to produce the final paint or aqueous coating composition. The addition of the biosurfactant (emulsifier) during formulation of paint or aqueous coating composition forms a coating composition having a lower VOC content while maintaining the stability of the aqueous coating composition at desirable levels and achieving a biocide and mildewcide activity.

Other Additives

As described above, the aqueous coating compositions of the invention include at least one latex polymer derived from at least one latex monomer, for example acrylic monomers and/or the other above-described latex monomers.

The aqueous coating compositions of the invention include less than 2% by weight and preferably less than 1.0% by weight of anti-freeze agents based on the total weight of the aqueous coating composition. For example, the aqueous coating compositions may be substantially free of anti-freeze agents.

The aqueous coating composition typically includes at least one pigment. The term "pigment" as used herein includes non-film-forming solids such as pigments, extenders, and fillers. The at least one pigment is preferably selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Suitable mixtures include blends of metal oxides such as those sold under the marks MINEX (oxides of silicon, aluminum, sodium and potassium commercially available from Unimin Specialty Minerals), CELITES (aluminum oxide and silicon dioxide commercially available from Celite Company), ATOMITES (commercially available from English China Clay International), and ATTAGELS (commercially available from Engelhard). More preferably, the at least one pigment includes TiO2, CaCO3 or clay. Generally, the mean particle sizes of the pigments range from about 0.01 to about 50 microns. For example, the TiO2 particles used in the aqueous coating composition typically have a mean particle size of from about 0.15 to about 0.40 microns. The pigment can be added to the aqueous coating composition as a powder or in slurry form. The pigment is preferably present in the aqueous coating composition in an amount from about 5 to about 50 percent by weight, more preferably from about 10 to about 40 percent by weight.

The coating composition can optionally contain additives such as one or more film-forming aids or coalescing agents. Suitable firm-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, additional biocides, additional mildewcides, colorants such as colored pigments and dyes, waxes, perfumes, co-solvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition.

The aqueous coating composition typically includes less than 10% of anti-freeze agents based on the total weight of the aqueous coating composition. Exemplary anti-freeze agents include ethylene glycol, diethylene glycol, propylene glycol, glycerol(1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating composition includes less than 5.0% or is substantially free (e.g. includes less than 0.1%) of anti-freeze agents. Accordingly, the aqueous coating composition of the invention preferably has a VOC level of less than about 100 g/L and more preferably less than or equal to about 50 g/L.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 85% by weight and more preferably from about 35% to about 80% by weight water. Stated differently, the total solids content of the aqueous coating composition is typically from about 15% to about 90%, more preferably, from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, additional biocides, additional mildewcides, colorants, waxes, and the like, that do not evaporate upon drying of the coating composition.

In one preferred embodiment of the invention, the aqueous coating composition is a latex paint composition comprising at least one latex polymer derived from at least one acrylic monomer selected from the group consisting of acrylic acid, acrylic acid esters, methacrylic acid, and methacrylic acid esters and at least one polymerizable alkoxylated surfactant; at least one pigment and water. As mentioned above, the at least one latex polymer can be a pure acrylic, a styrene acrylic, a vinyl acrylic or an acrylated ethylene vinyl acetate copolymer.

The present invention further includes a method of preparing an aqueous coating composition by mixing together at least one latex polymer derived from at least one monomer and copolymerized and/or blended with at least one biosurfactant as described above, and at least one pigment. Preferably, the latex polymer is in the form of a latex polymer dispersion. The additives discussed above can be added in any suitable order to the latex polymer, the pigment, or combinations thereof, to provide these additives in the aqueous coating composition. In the case of paint formulations, the aqueous coating composition preferably has a pH of from 7 to 10.

Other Biocides as an Additional Biocidal Compound

Most latex emulsions are water based and are prone to microbial attack. Biocides are typically added to the finished latex after all processing is completed to protect the latex from microbial attack. Biocides are substances that kill or inhibit the growth of microorganisms such as bacteria, fungi and algae. In addition to the Rhamnolipids and/or Sophorolipids, the compositions and methods of the present invention may contain other biocides. These other biocides may be selected from one or more members of the group consisting of chlorinated hydrocarbons, organometallics, halogen-releasing compounds, metallic salts, quaternary ammonium compounds, phenolics and organic sulfur compounds. Exemplary of organic sulfur compounds are compounds based on an isothiazolinone (also known as isothiazolothione) structure.

A big advantage of the present invention is using biosurfactants can reduce or eliminate the use of potentially less environmentally friendly biocidal chemicals (biocides). For example, the inventor has found combinations of biosurfactants, for example Rhamnolipids, permit use of significantly less Isothiazolinone biocides.

U.S. Pat. No. 5,373,016 to Brown et al. discloses isothiazolinone biocides. The biocidal activity of these compounds is effected by inactivation of essential enzymes of microbial metabolism which require sulfhydryl groups for activity. These enzymes include phosphoenolpyruvate transphosphorase and a number of dehydrogenases. The thio moiety of the isothiazolinone or isothiazolothione compounds reacts with the free sulfhydryl groups of an enzyme to form a disulfide bond between the enzyme molecule and the isothiazolinone or isothiazolothione molecule rendering the sulfhydryl unavailable for interaction with substrate or effector molecules.

Biocides which are widely used as latex preservatives include PROXEL GXL, having an active ingredient of 1,2-benzisothiazolin-3-one (BIT), PROMEXAL W50, having an active ingredient of 2-methyl-4,5-trimethylene-4-isothiazolin-3-one, and KATHON LX, a blend of 5-chloro-2-methyl-4-isothiazolin-3-one and 2-methyl-4-isothiazolin-3-one active ingredients.

Typical isothiazolinones or isothiazolothiones are represented by the general formula (V):

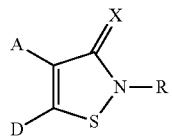

or a salt or a complex thereof;

wherein X is oxygen or sulfur; R is hydrogen, a substituted or unsubstituted hydrocarbyl group, a substituted or unsubstituted hydrocarbylthio group, a substituted or unsubstituted hydrocarbyloxy group or a carbamoyl group; and each of A and D is independently hydrogen, a halogen atom, a cyano group, a substituted or unsubstituted hydrocarbyl group or a direct bond to the other of A or D.

When R, A and D are, or contain, substituted hydrocarbyl groups, the substituents are preferably independently halogen, alkoxy or alkylthio where the alkyl groups contain 1 to 4 carbon atoms. If R is a carbamoyl group, preferably it is of the general type —CON(H)($R^1$) where $R^1$ is a hydrogen atom or a hydrocarbyl group, which may be substituted with halogen, alkoxy or alkylthio substituents. It is generally preferred that R is a hydrogen atom or a lower alkyl group of 1 to 4 carbon atoms. Most preferably, R is hydrogen or a methyl group.

Preferably, A and D, together with the carbon atoms to which they are attached, form a five- or six-membered substituted or unsubstituted ring. The ring substituents are preferably halogen, alkyl of 1 to 4 carbon atoms, alkoxy of 1 to 4 carbon atoms or alkylthio of 1 to 4 carbon atoms. The ring may contain a heteroatom such as a nitrogen atom replacing a carbon atom. Most preferably, A and D form a hydrocarbon ring such as benzene, cyclopentene or cyclohexene.

Alternatively, A and D are separate groups. Preferably, at least one of A and D is not a hydrogen atom and most preferably, at least one of A and D is a halogen atom or an alkyl group of 1 to 4 carbon atoms.

The biocidal isothiazolinone compounds include 5-chloro-2-methyl-4-isothiazolin-3-one (where R is methyl, A is hydrogen and D is chlorine); 2-methyl-4-isothiazolin-3-one (where R is methyl and A and D are both hydrogen); 4,5-dichloro-2-methylisothiazolin-3-one (where R is methyl and A and D are both chlorine); 2-n-octylisothiazolin-3-one (where R is n-octyl and A and D are both hydrogen; 1,2-benzisothiazolin-3-one (where R is hydrogen and A and D, together with the carbon atoms to which they are attached, form a benzene ring); 4,5-trimethylene-4-isothiazolin-3-one (where R is hydrogen and A and D, together with the carbon atoms to which they are attached, form a cyclopentene ring) and 2-methyl-4,5-trimethylene-4-isothiazolin-3-one (where R is methyl and A and D, together with the carbon atoms to which they are attached, form a cyclopentene ring).

A typical the biocidal compound of this family which may be used as the additional biocidal compound in the present invention is one where R is hydrogen and A and D together form an unsubstituted 5- or 6-membered hydrocarbon ring as in the compounds 1,2-benzisothiazolin-3-one and 4,5-trimethylene-4-isothiazolin-3-one.

Certain of the isothiazolinone (also known as isothiazolothione) compounds which may be used as the additional biocidal compound can have improved solubility in water when in the form of a salt or complex. The salt or complex may be with any suitable cation such as an amine (including an alkanolamine) or a metal. Preferably, any metal salt or complex contains a monovalent metal such as an alkali metal. The alkali metal may be lithium, sodium or potassium. Most preferably, the alkali metal salt is a sodium salt in view of the ready availability of suitable sodium compounds from which to prepare the salt.

Certain isothiazolinone compounds useful as the biocidal compounds decompose in the presence of alkali. Exemplary of alkali-sensitive compounds are 5-chloro-2-methyl-4-isothiazolin-3-one and 2-methyl-4-isothiazolin-3-one. Accordingly, the pH of the compositions of the present invention which are alkali sensitive should be maintained at a value no greater than about 8.

When adding biosurfactant as a biocide additive after emulsion typically the biosurfactant is added in an amount of 5 to 10000 ppm of total composition, preferably 5 to 1000 ppm, more preferably 5 to 500 ppm, more typically 10 to 300 ppm, or 200 to 300 ppm. The isothiazolinone could be present in an amount of 0.5 to 200 ppm, more typically 0.5 to 100 ppm or 1 to 100 ppm, or 0.5 to 25 ppm, total composition. If desired the composition may contain a higher concentration of biosurfactant, especially where the biosurfactant is performing more than one function.

Typically the weight ratio of the biosurfactant to isothiazolinones is 0.8:1 to 325:1, more typically 20:1 to 35:1.

In particular for treating bacteria the aqueous coating composition further comprises isothiazolinone biocide and typically the weight ratio of biosurfactant to isothiazolinone biocide is 200 to 500:0.3 to 1. Thus, in one aspect the invention includes an aqueous coating composition which further comprises isothiazolinone biocide and the weight ratio of biosurfactant to isothiazolinone biocide is 200 to 500:0.3 to 1.

For treating yeast and fungus the aqueous coating composition further comprises isothiazolinone biocide and typically the weight ratio of biosurfactant to isothiazolinone biocide is 200 to 500:5 to 30. Thus, in another aspect the invention includes an aqueous coating composition which further comprises isothiazolinone biocide and the weight ratio of biosurfactant to isothiazolinone biocide is 200 to 500:5 to 30.

The present invention will now be further described by the following non-limiting examples.

EXAMPLES

In microbiology, minimum inhibitory concentration (MIC) is defined as the lowest concentration of an antimicrobial that will inhibit the growth of an microorganism after overnight or long incubation. Minimum inhibitory concentrations are important in diagnostic laboratories to confirm resistance of microorganisms to an antimicrobial agent and also to monitor the activity of new antimicrobial agents. A lower MIC is an indication of a better antimicrobial agent. An MIC determination is generally regarded as the most basic laboratory measurement of the activity of an antimicrobial agent against an organism.

MIC determinations were done in broth media by the two fold dilution method using the 96 and/or 24 well microtiter plates.

The invention examples employed a biosurfactant Rhamnolipid (ZONIX JDR505 Rhamnolipid at 5% Rhamnolipid concentration) from Jeneil Biosurfactant Co. (Sauksville, Wis.) as primary antimicrobial compound; Decanoic acid, 3-[[6-deoxy-2-O-(6-deoxy-alpha-Lmannopyranosyl)-alpha-L-mannopyranosyl]oxy]-, 1-(carboxymethyl)octyl ester, mixture with 1-(carboxymethyl)octyl 3-[(6-deoxy-alpha-L-mannopyranosyl)oxy]decanoate.

Chemical structures of Rhamnolipid produced by *Pseudomonas aeruginosa* are shown as structures A and B.

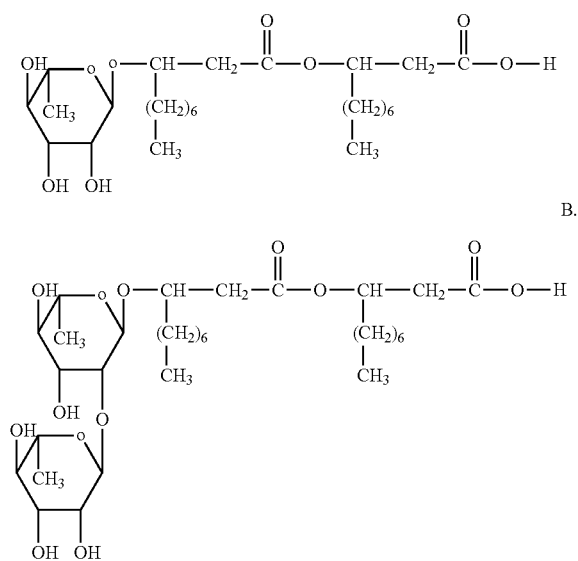

Rhamnolipid biosurfactants work by disrupting cell membranes. The targeted fungal pest zoospores are especially vulnerable because they lack the protective cell wall present in the fungal pest's other life stages.

A working secondary stock solution of the Rhamnolipid was prepared by making 4× the concentration needed in the first row wells 1 to 4 and wells 7 through 10. Example, for 1000 ppm level desired in the first row, a stock of 4000 ppm Rhamnolipid was prepared from the 5% Rhamnolipid primary stock solutions. To start with, 100 μL of sterile water was dispensed into all 96 wells. Then 100 μL of the 4× Rhamnolipid was dispensed into the specified wells in first row, the samples were serially diluted two fold into rows B through H. The $5^{th}$ and $11^{th}$ columns were the media blanks and $6^{th}$ and $12^{th}$ columns are inoculum controls. Bacterial controls are prepared in 2× (nutrient broth) NB and a 100 μL was dispensed in each well.

For bacterial MIC determination, an overnight culture was diluted to approximately $1 \times 10^7$ cfu (colony forming unit) cells and suspended in 2× NB and 100 μL was added to each of the respective wells. For yeast and fungal inoculum, a 5 day old culture plate was swabbed and the cells and spores were suspended in sterile water at $10^5$ cfu per mL spores and it was used to suspend them in Sabroud's Broth [SAB] medium for inoculation.

For the MIC determination of a combination of biocides with Rhamnolipids, the working stock solution of the Co-Biocide A (such as an Isothiazolinone) will be 8× the concentration desired in first well of the microtiter plate. The working solution for Rhamnolipid [as the primary biocide B] will be 4× the concentration in microtiter plates. For determining MIC of individual biocides or Rhamnolipids, the working stock solutions of Biocide A (Isothiazolinone) and Biocide B (Rhamnolipid) will both be 4× the concentration desired in the first well of the microtiter plates.

The levels evaluated for Biocide A were as follows:

CMIT/MIT [3 chloromethyl Isothiazolinone/Methyl Isothiazolinone] 25 ppm, 12.5 ppm, 6.25 ppm, 3.125, 1.56 and 0.78.

MIT [Methyl Isothiazolinone]: 100 ppm, 50 ppm, 25 ppm, 12.5, 6.25 and 3.12.

BIT [Benz Isothiazolinone]: 100 ppm, 50 ppm, 25 ppm, 12.5, 6.25 and 3.12.

The levels evaluated for Biocide B were as follows:

Rhamnolipid: 1000 ppm, 500 ppm, 250 ppm, 125 ppm, 62.5 ppm, 31.3, 15.6 and 7.81.

3 chloromethyl Isothiazolinone has the formula A

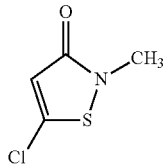

Methyl Isothiazolinone has the formula B

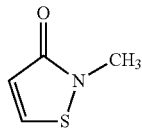

BIT [Benz Isothiazolinone] has the formula C.

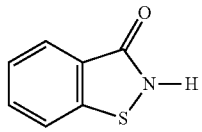

The protocol used for this method is based on two US Patent Application Publications: US patent application publication 2007/0203126 to Carlson et al. entitled Synergistic mixtures of O-phenylphenol (OOP) and DAZOMET pesticide; and US patent application publication 2010/0160445 to Carlson et al. entitled Synergistic mixtures of OPP and DAZOMET pesticide, both incorporated herein by reference in their entireties.

Rhamnolipid was tested in combination with known antimicrobial compounds. The synergistic blends were determined using a dose protocol. The combinations were evaluated in aqueous nutrient both with pH values of 5.5 and 7.0. The materials were tested against bacteria, fungi and yeast. However, the effect is not limited to these bacteria. Two of the strains it was tested against were *Candida albicans* (a yeast, ATCC #10231) and *Aspergillus niger* (a fungus, ATCC #16404). It was also tested against the Gram negative bacteria *E. coli* (ATCC #8739), *Pseudomonas aeruginosa* (ATCC #9027), and *Burkhlderia cepacia* (ATCC 25416). It was also tested against the Gram positive bacterial *Bacillus cereus* (ATCC #11778) and *Staphylococcus aureus* (ATCC #6538). Each strain was inoculated at 37° C. overnight then suspended in sterile saline. Individual organisms were distributed into the wells of a microtiter plate in the presence or absence of various concentrations of the active materials. The microtiter plates were incubated at 37° C. and growth in wells were monitored visually after 24, 48 and 72 hours and graded as positive or negative for growth. The minimum inhibitory concentration was noted on the well where there was no growth observed.

The synergism index (SI) was calculated by the equations described by F. C. Kull, P. C. Eisman, H. D. Sylwestrowicz, and R. L. Mayer (1961), Applied Microbiology 9, 538-541. The values are based on the amount needed to achieve a specified end point. The end point selected for these studies was 100% inhibition of microbial growth as determined visually.

$$\text{Synergy Index (SI)}=(QA/Qa)+(QB/Qb)$$

where: QA=quantity of compound A in mixture, producing the end point Qa=quantity of compound $A_1$ acting alone, producing the end point QB=quantity of compound B in mixture, producing the end point Qb=quantity of compound $B_1$ acting alone, producing the end point.

If SI is less than 1, synergism exists; if SI is greater than 1, antagonism exists, if SI is equal to 1, an additive effect exists.

Example 1

Determination of Rhamnolipid Activity Against Yeast (*Candida albicans*) and Fungi (*Aspergillus niger*)

This example determined the minimum inhibitory concentration (MIC) of Rhamnolipid against *Candida albicans* and *Aspergillus niger*.

FIG. 1 is a photo of the microtiter plate employed in Example 1. The microtiter plate of FIG. 1 is a 96 well plate. In the tested microtiter plate, from left to right, columns 1-6 tested Rhamnolipid with *Candida albicans* and columns 7-12 tested Rhamnolipid with *Aspergillus niger*. Rows A-H had varying amounts of Rhamnolipid. A two fold dilutions of Rhamnolipids was made by serially diluting from Row A at 1000 ppm by weight through Row B at 500 ppm, Row C at 250 ppm, Row D at 125 ppm, Row E at 62.5 ppm, Row F at 31.3 ppm, Row G at 15.6 ppm and Row H at 7.81 ppm of Rhamnolipid.

Columns 1-4 had media inoculated with *Candida albican*, organism and Rhamnolipid. Column 5 was a media blank with no organism and no Rhamnolipid. Column 6 had been inoculated with *Candida albicans* in media as positive control.

Columns 7-10 had media inoculated with *Aspergillus niger* spores, and Rhamnolipid. Column 11 had media blank, no organism and no Rhamnolipid. Column 12 had been inoculated with *Aspergillus niger* spores in media as positive control.

TABLE 1 shows the minimum inhibitory concentration (MIC) of Rhamnolipid against *Candida albicans* and *Aspergillus niger*.

TABLE 1

Minimum Inhibitory Concentration (MIC) Determination of Rhamnolipid against *Candida albicans* and *Aspergillus niger*

| | | Candida albicans | | | | | | Aspergillus niger | | | | | |
|---|---|---|---|---|---|---|---|---|---|---|---|---|---|
| | ppm | 1 | 2 | 3 | 4 | 5 | 6 | 7 | 8 | 9 | 10 | 11 | 12 |
| A | 1000 | + | + | + | + | − | + | + | + | + | + | − | + |
| B | 500 | + | + | + | + | − | + | + | + | + | + | − | + |
| C | 250 | + | + | + | + | − | + | + | + | + | + | − | + |
| D | 125 | + | + | + | + | − | + | + | + | + | + | − | + |
| E | 62.5 | + | + | + | + | − | + | + | + | + | + | − | + |
| F | 31.3 | + | + | + | + | − | + | + | + | + | + | − | + |

TABLE 1-continued

Minimum Inhibitory Concentration (MIC) Determination of Rhamnolipid against *Candida albicans* and *Aspergillus niger*

| | | Candida albicans | | | | | | Aspergillus niger | | | | | |
|---|---|---|---|---|---|---|---|---|---|---|---|---|---|
| | ppm | 1 | 2 | 3 | 4 | 5 | 6 | 7 | 8 | 9 | 10 | 11 | 12 |
| G | 15.6 | + | + | + | + | − | + | + | + | + | + | − | + |
| H | 7.81 | + | + | + | + | − | + | + | + | + | + | − | + |

Notes:
+ Growth
− No Growth

Example 2

Rhamnolipid Activity Against Yeast (*Candida albicans*)

Figure 2:
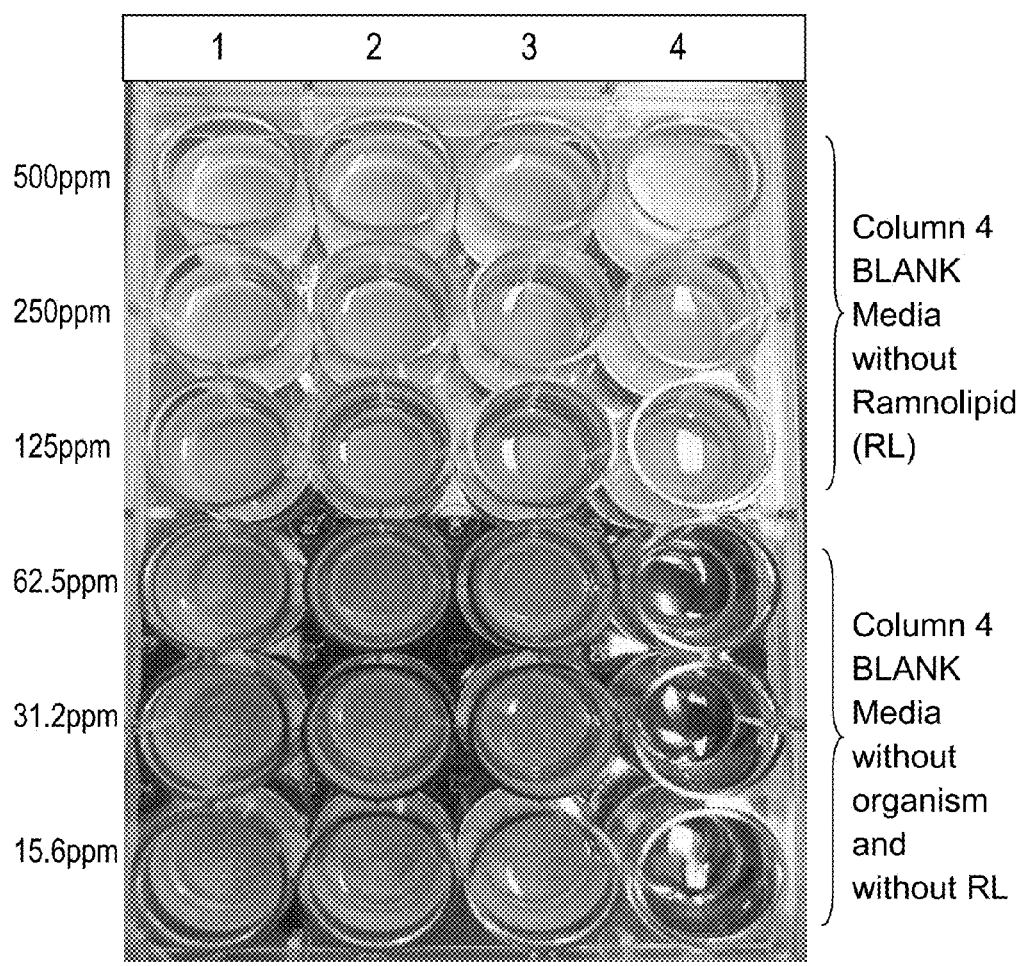
FIG. 2 shows an expanded view of a portion of a microtiter plate employed in Example 2 for an MIC determination of Rhamnolipid against *Candida albicans*.

Using the same protocol as in Example 1 another MIC determination of Rhamnolipid against *Candida albicans* was conducted. FIG. 2 shows an expanded view of a portion of a microtiter plate employed for this MIC determination of Rhamnolipid against *Candida albicans*. From left to right in FIG. 2, columns 1-3 had media, organism and Rhamnolipid. From top to bottom FIG. 4, the tested cells having respective concentrations of 500, 250, 125, 6215, 31.2 and 15.6 ppm Rhamnolipid. Column 4, top three rows, had organism in media with no Rhamnolipid. Column 4 bottom three rows had media with no organism and no Rhamnolipid.

This shows the effectiveness of Rhamnolipids against *Candida albicans*.

FIG. 2 is a photo of the microtiter plate employed in Example 2. The microtiter plate of FIG. 2 is a 24 well microtiter plate. This microtiter plate of FIG. 2 is a larger well plate than shown in FIG. 1. However, it confirms the observation seen in the microtiter plate of FIG. 1.

Example 3

Activity of CMIT/MIT with and without Rhamnolipids Against Fungus (*Aspergillus niger*)

The procedure of Example 1 was repeated to test the activity against fungus (*Aspergillus niger*) of a CMIT/MIT mixture (Kathon™LX 1.5% available from Dow Chemical) with and without Rhamnolipids.

Figure 3:
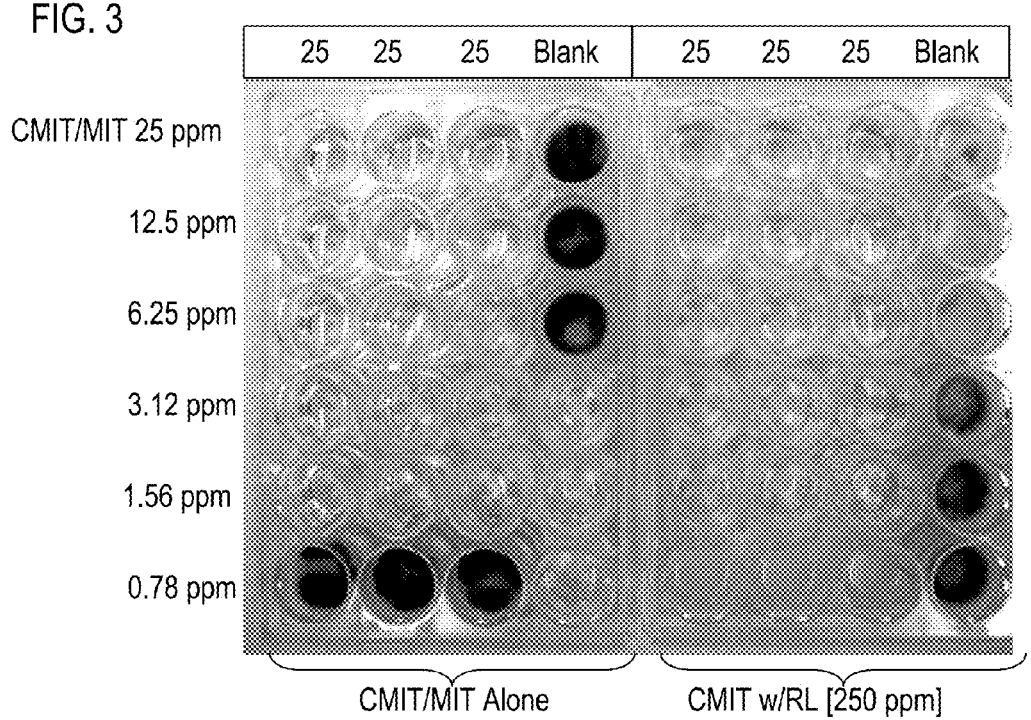
FIG. 3 shows a photograph of the microtiter plate used for Example 3 showing synergy of Rhamnolipid with CMIT/MIT against *Aspergillus niger*.

FIG. 3 shows a photograph of two 24 well microtiter plates used for this example. From left to right, columns 1-3 employed media, organism and CMIT/MIT alone. Column 4 was a blank with media and organism in the top three rows and media alone in the bottom three rows. Columns 5-7 employed media, organism and CMIT/MIT. Column 8 employed media, Rhamnolipid and no organism in the top three rows and media, Rhamnolipid and organism in the bottom three rows. In the figures ppm means parts per million active by weight. KATHON LX 1.5% is a combination product of CMIT/MIT at 3:1 ratio Results show the Minimum Inhibitory Concentration for CMIT/MIT is 1.56 ppm and for combination of CMIT/MIT with 250 ppm Rhamnolipid the value decreased by two fold to <0.78 ppm.

TABLE 2 pictorially summarizes the results.

TABLE 2

|  | CMIT/MIT Alone |  |  | Blanks | CMIT/MIT with Ramnolipid (250 ppm) |  |  | Blanks |
|---|---|---|---|---|---|---|---|---|
| 25 ppm CMIT/MIT | − | − | − | + | − | − | − | ±w/RL |
| 12.5 | − | − | − | + | − | − | − | ±w/RL |
| 6.25 | − | − | − | + | − | − | − | ±w/RL |
| 3.125 | − | − | − | − | − | − | − | +w/o RL |
| 1.56 | − | − | − | − | − | − | − | +w/o RL |
| 0.78 | + | + | + | − | − | − | − | +w/o RL |

Notes:
+ Growth
− No Growth

Figure 4:
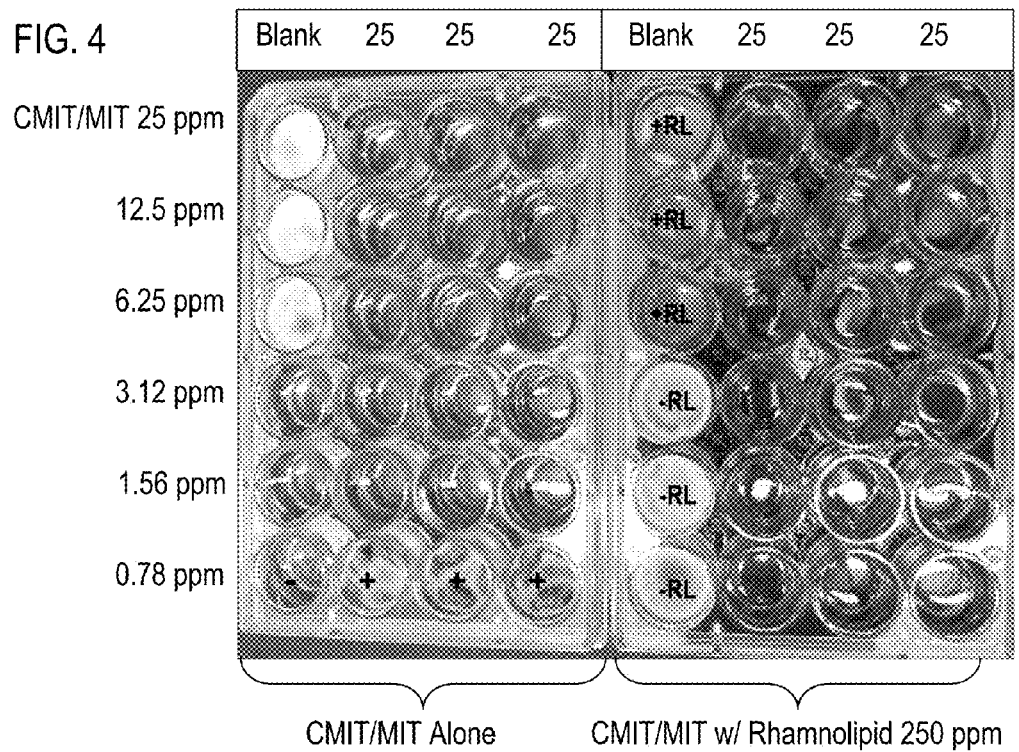
FIG. 4 shows additional data resulting from testing another set of samples for Example 3 showing antifungal activity of CMIT/MIT with and without Rhamnolipid against *Aspergillus niger*.

FIG. 4 shows additional data resulting from testing another set of samples of CMIT/MIT with or without 250 ppm Rhamnolipid (RL) using the procedure used to obtain the data of TABLE 2.

In FIG. 4 from left to right the first column was a blank wherein the top three rows had media and organism and the bottom three rows had media alone. The second, third and fourth rows had media, organism and the KATHON LX 1.5% mixture of CMIT/MIT. The fifth row was a blank wherein the top three rows had media and Rhamnolipid and the bottom three rows had media and organism. Rows sixth, seventh and eight rows had CMIT/MIT with media, organism and Rhamnolipid.

This set of tests confirmed the data of TABLE 2, and found the inhibitory concentration of CMIT/MIT against *Aspergillus niger* is 1.56 ppm (left plate) and when combined with 250 ppm of RL, the MIC is lower than 0.78 (which could be 0.39 ppm).

Example 4

Activity Against Yeast (*Candida albicans*) and Other Organisms of CMIT/MIT with and without 250 Ppm Rhamnolipids The procedure of Example 1 was repeated to test the Activity of the KATHON LX 1.5% mixture of CMIT/MIT with and without Rhamnolipids against yeast (*Candida albicans*).

Figure 5:
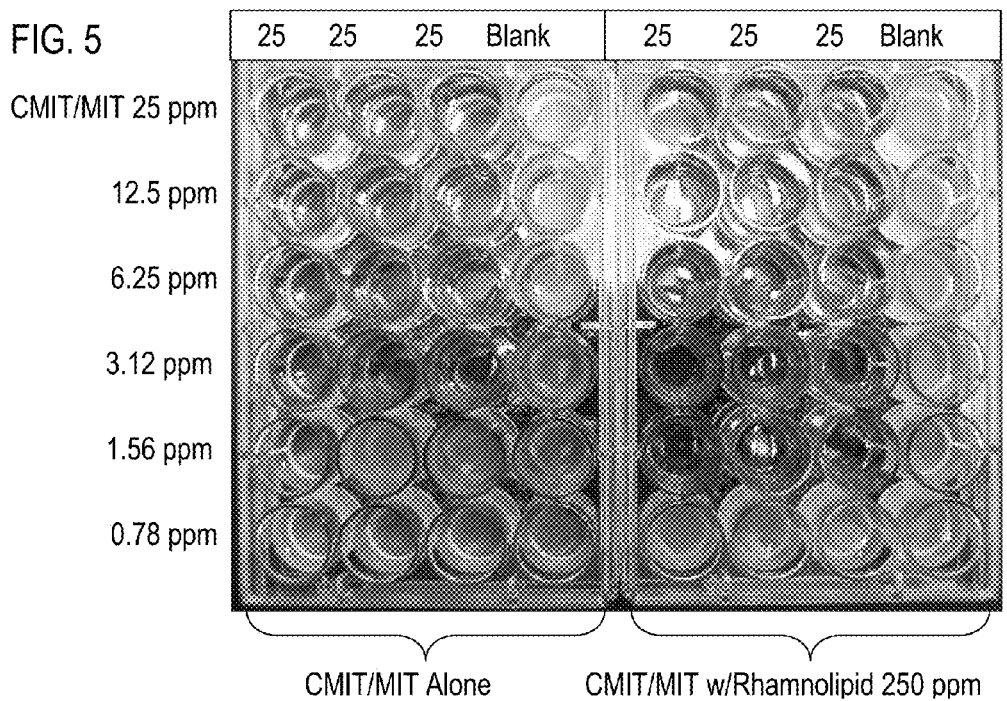
FIG. 5 shows a photograph of the microtiter plate used for Example 4 showing anti-yeast (*Candida albicans*) activity of CMIT/MIT with and without Rhamnolipids.

FIG. 5 shows a photograph of the microtiter plate used for this example.

In FIG. 5 from left to right the first three rows are media, organism and CMIT/MIT. The fourth row has blanks wherein the top three rows have organism and media and the bottom three rows have media alone. The fifth, sixth and seventh rows have media, organism, CMIT/MIT and Rhamnolipid. The eight row has blanks of media and Rhamnolipid.

This example found the Minimum Inhibitory Concentration (MIC) of a KATHON LX 1.5% mixture of CMIT/MIT against *Candida albicans* is 3.12 ppm. The combination of a KATHON LX 1.5% mixture of CMIT/MIT with Rhamnolipid [250 ppm] lowers MIC by 2 fold to 1.56 ppm.

This Example was repeated against G+ Bacteria and G− Bacteria. The MIC of CMIT/MIT alone against *E. Coli* was about 0.35 ppm; against *P. aeruginosa* was 0.35 ppm; and against *B. cepacis* was 0.35 ppm. CMIT/MIT and 250 ppm Rhamnolipid appeared to inhibit everything at the tested amounts.

TABLES 3 and 4 pictorially show the results of testing MIC of CMIT/MIT without and with Rhamnolipid against Gram negative Bacteria (*E. coli, P. aeruginosa* and *B. cepacia*).

TABLE 3

Minimum Inhibitory Concentration of CMIT/MIT without Rhamnolipid against G− Bacteria (*E. coli, P. aeruginosa, B. cepacia*)

|  |  | E. coli |  |  |  | P. aeruginosa |  |  |  | B. cepacia |  |  |  |
|---|---|---|---|---|---|---|---|---|---|---|---|---|---|
|  | PPM | 1 | 2 | 3 | 4 | 5 | 6 | 7 | 8 | 9 | 10 | 11 | 12 |
| A | 20 | − | − | − | + | − | − | − | + | − | − | − | + |
| B | 10 | − | − | − | + | − | − | − | + | − | − | − | + |
| C | 5 | − | − | − | + | − | − | − | + | − | − | − | + |
| D | 2.5 | − | − | − | + | − | − | − | + | − | − | − | + |
| E | 1.25 | − | − | − | − | − | − | − | − | − | − | − | − |
| F | 0.63 | − | − | − | − | − | − | − | − | − | − | − | − |
| G | 0.31 | − | − | − | − | + | + | + | − | + | + | + | − |
| H | 0.16 | + | + | + | − | + | + | + | − | + | + | + | − |

Notes:
+ Growth
− No Growth

Columns 4, 8 and 12 are blank media with rows A-D inoculated with bacteria and rows E-H uninoculated.

Result: MIC of CMIT/MIT against *E. coli* is 0.31 ppm, against *P. aeruginosa* and *B. cepacia* are 0.63 ppm

TABLE 4

Minimum Inhibitory Concentration of CMIT/MIT with Rhamnolipid at 250 ppm against G− Bacteria (*E. coli, P. aeruginosa, B. cepacia*)

|  |  | E. coli |  |  |  | P. aeruginosa |  |  |  | B. cepacia |  |  |  |
|---|---|---|---|---|---|---|---|---|---|---|---|---|---|
|  | PPM | 1 | 2 | 3 | 4 | 5 | 6 | 7 | 8 | 9 | 10 | 11 | 12 |
| A | 20 | − | − | − | + | − | − | − | + | − | − | − | + |
| B | 10 | − | − | − | + | − | − | − | + | − | − | − | + |
| C | 5 | − | − | − | + | − | − | − | + | − | − | − | + |
| D | 2.5 | − | − | − | + | − | − | − | + | − | − | − | + |
| E | 1.25 | − | − | − | − | − | − | − | − | − | − | − | − |
| F | 0.63 | − | − | − | − | − | − | − | − | − | − | − | − |
| G | 0.31 | − | − | − | − | − | − | − | − | − | − | − | − |
| H | 0.16 | − | − | − | − | − | − | − | − | − | − | − | − |

Notes:
+ Growth
− No Growth

Result: MIC of CMIT/MIT in presence of Rhamnolipid at 250 ppm lowered to <0.16 ppm against all bacteria tested.

TABLE 5 lists the synergy index for mixtures of this Rhamnolipid with this CMIT/MIT in nutrient broth for a range of organisms, namely fungi, yeast, G+ and G− bacteria. Concentrations listed in TABLE 5 are in ppm of active ingredient.

TABLE 5

Calculation of Synergy Index of CMIT/MIT and Rhamnolipid in Broth Medium* for Fungi, Yeast, G+ and G− Bacteria

|  | CMIT/MIT/RL 250 ($Q_a$) | CMIT/MIT Alone ($Q_A$) | RL/CMIT/MIT ($Q_b$) | RL Alone ($Q_B$) | Synergy Index [SI] = (Qa/QA) + (Qb/QB) | SI |
|---|---|---|---|---|---|---|
| *Aspergillus niger* | 0.39 | 1.56 | 250 | 1000 | 0.5 | <1 |
| *Candida albicans* | 0.39 | 1.56 | 250 | 1000 | 0.5 | <1 |
| *Bacillus cereus* | 0.39 | 0.78 | 250 | 1000 | 0.75 | <1 |
| *S. aureus* | 0.39 | 0.78 | 250 | 1000 | 0.75 | <1 |
| *E. coli* | 0.78 | 0.78 | 250 | 1000 | 1.25 | >1 |

TABLE 5-continued

Calculation of Synergy Index of CMIT/MIT and Rhamnolipid
in Broth Medium* for Fungi, Yeast, G+ and G− Bacteria

| | CMIT/ MIT/ RL 250 ($Q_a$) | CMIT/ MIT Alone ($Q_A$) | RL/ CMIT/ MIT ($Q_b$) | RL Alone ($Q_B$) | Synergy Index [SI] = (Qa/QA) + (Qb/QB) | SI |
|---|---|---|---|---|---|---|
| P. aeruginosa | 0.78 | 1.56 | 250 | 1000 | 0.7375 | <1 |
| B. cepacia | 0.39 | 1.56 | 250 | 1000 | 0.49375 | <1 |

Synergy Index SI = Qa/QA + Qb/QB where
Qa = MIC concentration in ppm of Biocide in the combination with 250 ppm Rhamnolipid (RL)
QA = MIC concentration in ppm of Biocide CMIT/MIT Alone
Qb = MIC concentration in ppm of Rhamnolipid in the combination w/biocide
QB = MIC concentration in ppm of Rhamnolipid Alone
*Nutrient Broth for Bacteria and Sabrouds Broth for Yeast and Fungi
SI of <1 is considered as Synergistic, =1 Additive and >1 is Antagonistic effect Example 5

Activity of Methyl Isothiazolinone [MIT] with and without Rhamnolipids

The procedure of Example 1 was repeated to test the Antifungal (*Aspergillus niger*) Activity of the MIT (NEOLONE 950, available from Dow Chemical) with and without Rhamnolipids In particular, this example determined the Minimum Inhibitory Concentration (MIC) of MIT with and w/o Rhamnolipid [250 ppm] against *Aspergillus niger*.

Figure 6:
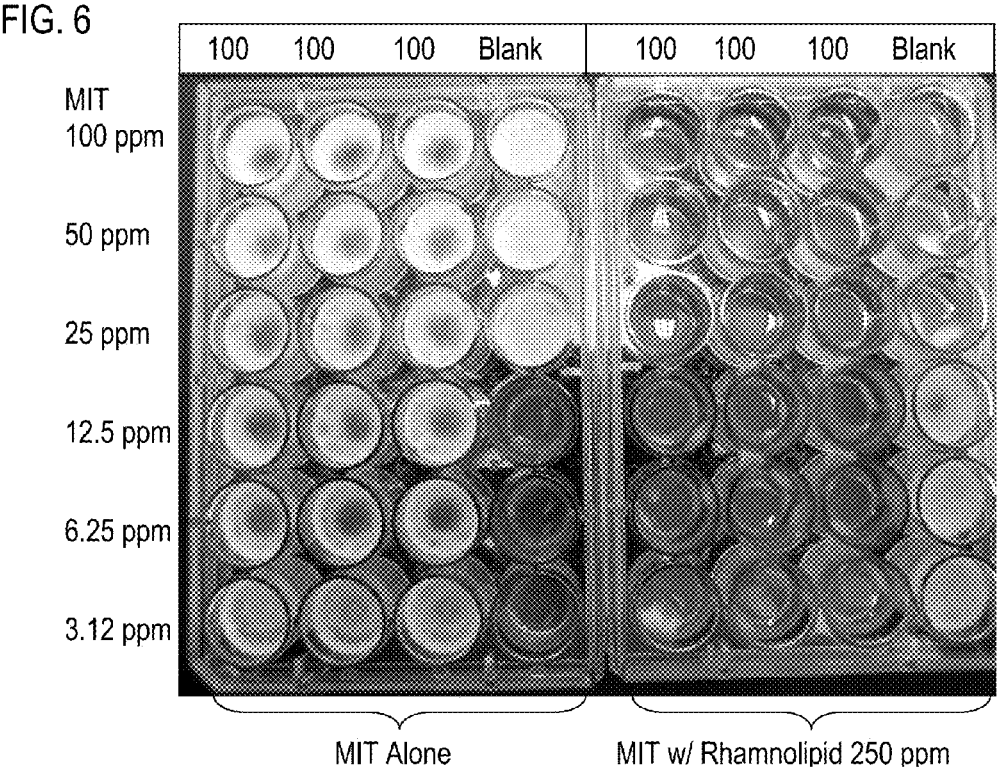
FIG. 6 shows a photograph of the microtiter plate used for Example 5 showing activity of MIT with and without Rhamnolipids to show Minimum Inhibitory Concentration (MIC) of MIT with and without Rhamnolipid (250 ppm) against *Aspergillus niger*.

FIG. 6 shows a photograph of the microtiter plate used for this example. This photograph of Minimum Inhibitory Concentration of MIT against *Aspergillus niger* shows it is not effective even up to 100 ppm (columns 1, 2, 3 on the left of the plate). However, in combination with Rhamnolipid a complete inhibition was noted particularly (Columns 5, 6, 7 on the right plates). Use of Rhamnolipid in combination with MIT also appears to inhibit spore formation in these fungi.

This test procedure was repeated against Yeast, G+ Bacteria and G− Bacteria. The MIC of MIT alone against *E. Coli* was about 25 ppm; against *P. aeruginosa* was 12.5 ppm; and against *B. cepacis* was 25 ppm. MIT and 250 ppm Rhamnolipid appeared to inhibit everything at the tested amounts.

TABLE 6 lists the synergy index for mixtures of Rhamnolipid with CMIT/MIT in nutrient broth for a range of organisms, namely Fungi, Yeast, G+ and G− Bacteria. Values in TABLE 6 are in ppm by weight active ingredient.

TABLE 6

Calculation of Synergy Index of MIT and Rhamnolipid Combination
in Broth Media* for Fung., Yeast, G+ and G− Bacteria

| | MIT/RL 250 ppm ($Q_a$) | MIT Alone ($Q_A$) | RL/ MIT ($Q_b$) | RL Alone ($Q_B$) | Synergy Index = (Qa/QA) + (Qb/QB) | SI |
|---|---|---|---|---|---|---|
| Aspergillus niger | 0.78 | 100 | 250 | 1000 | 0.2578 | <1 |
| Candida albicans | 50 | 100 | 250 | 1000 | 0.75 | <1 |
| Bacillus cereus | 0.78 | 25 | 250 | 1000 | 0.2812 | <1 |
| S. aureus | 0.78 | 25 | 250 | 1000 | 0.2812 | <1 |
| E. coli | 50 | 50 | 250 | 1000 | 1.25 | >1 |
| P. aeruginosa | 12.5 | 25 | 250 | 1000 | 0.75 | <1 |
| B. cepacia | 12.5 | 25 | 250 | 1000 | 0.75 | <1 |

Synergy Index SI = Qa/QA + Qb/QB where
Qa = MIC concentration in ppm of Biocide in the combination with 250 ppm Rhamnolipid (RL)
QA = MIC concentration in ppm of Biocide Alone
Qb = MIC concentration in ppm of Rhamnolipid in the combination w/biocide
QB = MIC concentration in ppm of Rhamnolipid Alone
SI of <1 is considered as Synergistic, =1 Additive and >1 is Antagonistic effect Example 6

Activity of BIT with and without Rhamnolipids

The procedure of Example 1 was repeated to test the Antiyeast (*Candida albicans*) Activity of the BIT (PROXEL GXL, available from Arch Chemicals, Inc., Symra, Ga.) with and without Rhamnolipids. In particular this example determined the Minimum Inhibitory Concentration (MIC) of MIT with and w/o Rhamnolipid [250 ppm] against *Aspergillus niger*.

Figure 7:
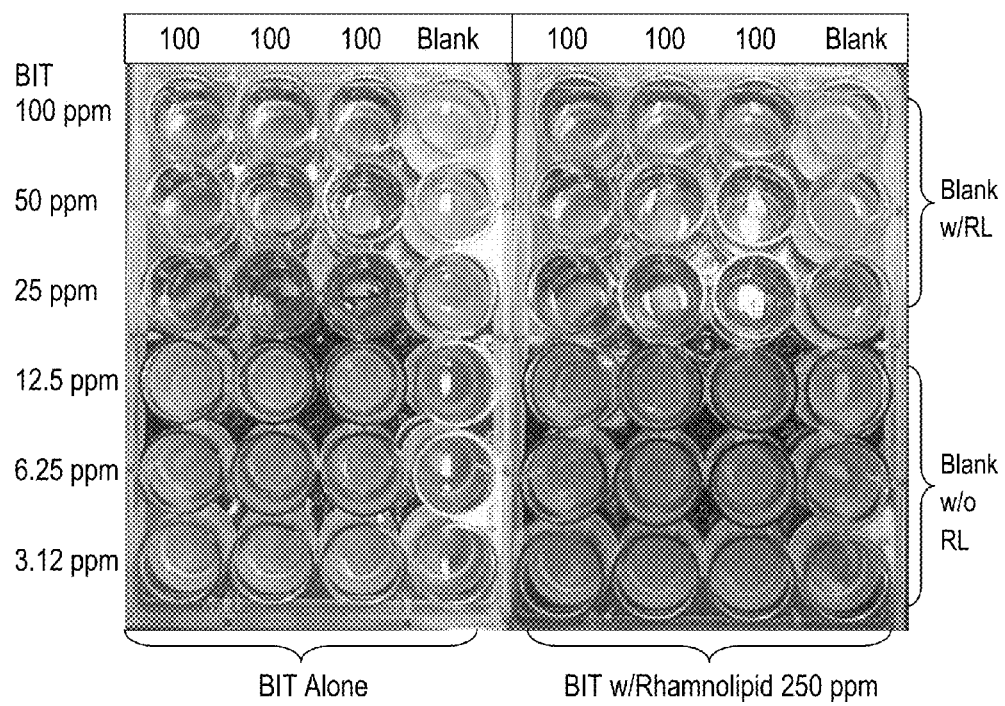
FIG. 7 shows a photograph of the microtiter plate used for Example 6 for a MIC Determination of BIT with and without Rhamnolipid against *Candida albicans* showing activity of BIT with and without Rhamnolipids.

FIG. 7 shows a photograph of the microtiter plate used for this example. No change in MIC levels was observed for BIT without Rhamnolipid BIT as compared with Rhamnolipid.

This test procedure was repeated against Yeast, G+ Bacteria and G− Bacteria. The MIC of BIT alone against *E. Coli* was about 12.5 ppm; against *P. aeruginosa* was 25 ppm; and against *B. cepacis* was 50 ppm. BIT and 250 ppm Rhamnolipid appeared to inhibit everything at the tested amounts.

TABLE 7 lists the synergy index for mixtures of this Rhamnolipid with this CMIT/MIT in nutrient broth for a range of organisms, namely Fungi, Yeast, G+ and G− Bacteria.

TABLE 7

Calculation of Synergy Index between BIT and Rhamnolipid
in Broth Medium for Fungi, Yeast, G+ and G− Bacteria

| | BIT/RL 250 ppm ($Q_a$) | BIT Alone ($Q_A$) | RL/ BIT ($Q_b$) | Rhamnolipid Alone ($Q_B$) | Synergy Index = (Qa/QA) + (Qb/QB) | SI |
|---|---|---|---|---|---|---|
| Aspergillus niger | 25 | 50 | 250 | 1000 | 0.75 | <1 |
| Candida albicans | 3.12 | 25 | 250 | 1000 | 0.3748 | <1 |
| Bacillus cereus | 0.78 | 25 | 250 | 1000 | 0.2812 | <1 |
| S. aureus | 0.78 | 25 | 250 | 1000 | 0.2812 | <1 |
| E. coli | 50 | 50 | 250 | 1000 | 1.25 | >1 |
| P. aeruginosa | 12.5 | 25 | 250 | 1000 | 0.75 | <1 |
| B. cepacia | 12.5 | 25 | 250 | 1000 | 0.75 | <1 |

Synergy Index SI = Qa/QA + Qb/QB where
Qa = MIC concentration in ppm of Biocide in the combination with 250 ppm Rhamnolipid [RL]
QA = MIC concentration in ppm of Biocide Alone
Qb = MIC concentration in ppm of Rhamnolipid in the combination w/biocide
QB = MICy concentration in ppm of Rhamnolipid Alone
SI of <1 is considered as Synergistic, =1 Additive and >1 is Antagonistic effect The above data shows the Rhamnolipid had good efficacy in combination with the Isothiazolinone biocides: CMIT/MIT (KATHON LX™ 1.5%), MIT [Neolone™ 950] and BIT [PROXEL GXL]. The Rhamnolipid improved MIC of the Isothiazolinone biocides against G+ bacteria, yeast and mold. The Rhamnolipid also had good efficacy against *Aspergillus niger*.

Example 7

Activity of Rhamnolipids in Acrylic Paint

An in-can efficacy test was performed. The acrylic paint formulation details are provided in TABLE 8, where four different types of surfactants were compared. The surfactants were: AGNIQUE PG 8105, AGNIQUE PG 8166, RHODOLINE WA 100, BYK 245 and the Rhamnolipid employed in prior examples (ZONIX JBR 505 Rhamnolipid solution) and ZONIX Rhamnolipid solution at an 8.5% Rhamnolipid concentration]. TABLE 9 shows the paint properties comparison for KU viscosity, Gloss, and Flow and leveling. The results show the Rhamnolipids were comparable to RHODOLINE and BYK surfactants.

TABLE 8

Paint Formulation [Semi-Gloss] for testing:

| Raw materials | Pounds | Gallons | Weight % |
|---|---|---|---|
| Pigment Grind | | | |
| Water | 116.00 | 13.89 | 10.86 |
| KTPP (potassium tripolyphosphate) | 1.00 | 0.10 | 0.09 |
| RHODOLINE 286N anionic surfactant (ammonium polyacrylate copolymer solution) available from Rhodia Inc. | 5.00 | 0.51 | 0.47 |
| RHODOLINE 697 nonionic surfactant (oil based defoamer) available from Rhodia Inc. | 1.00 | 0.14 | 0.09 |
| Titanium dioxide CR826 available from TRONOX Ltd. | 270.00 | 8.08 | 25.28 |
| Sub-total | 393.00 | | 0.00 |
| Letdown | | | |
| Water | 80.00 | 9.58 | 7.49 |
| OPTIVE 130 all-acrylic latex polymer available from BASF | 500.00 | 56.50 | 46.82 |
| RHODOLINE 697 | 4.00 | 0.56 | 0.37 |
| Wetting agent* | 6.00 | 0.78 | 0.66 |
| Ammonia (28%) | 1.70 | 0.22 | 0.16 |
| AQUAFLOW NHS-300 nonionic associative polymer solution available from Hercules Inc. | 16.20 | 1.87 | 1.52 |
| ACRYSOL RM8W nonionic urethane rheology modifier available from Dow Chemical | 24.00 | 2.76 | 2.25 |
| Water | 6.00 | 4.79 | 3.75 |
| Total | 1067.90 | 100.03 | 100.00 |

*Wetting Agents:
ZONIX 8.5%—Biofungicide, contains 8.5% by weight rhamnolipid biosurfactant available from Jeneil Biosurfactant
ZONIX JBR 505—Biofungicide, contains 5% by weight rhamnolipid biosurfactant available from Jeneil Biosurfactant
AGNIQUE PG 8105—Surfactant--an alkyl polyglucoside in which the alkyl group contains 8 to 10 carbon atoms and having an average degree of polymerization of 1.5 available from BASF Inc.
AGNIQUE PG 8166—Surfactant--an alkyl polyglucoside in which the alkyl group contains 8 to 16 carbon atoms and having an average degree of polymerization of 1.6 available from BASF Inc.
RHODOLINE WA100—Blend of non-ionic surfactants available from Rhodia Inc.
BYK 345—Silicone surfactant (Polyether-modified siloxane) available from BYK Gardner Inc.

TABLE 9 shows the paint properties comparison between two Rhamnolipids verses 4 different surfactants including AGNIQUE™ PG from BASF, RHODOLINE™ from Rhodia, and BYK™-345 from BYK Gardner. The AGNIQUE surfactants are alkylpolyglucoside based surfactants, RHODOLINE WA100 surfactant is a proprietary blend of non-ionic wetting agent, and BYK 345 silicone surfactant.

TABLE 9

| | Samples ID | | | | | |
|---|---|---|---|---|---|---|
| | paint - 1 | paint - 2 | paint - 3 | paint - 4 | paint - 5 | paint - 6 |
| Surfactant | ZONEX 8.5% | ZONEX JBR 505 | AGNIQUE PG 8105 | AGNIQUE PG 8166 | RHODOLINE WA 100 | BYK 345 |
| lbs. Thickner (Dry)/1067.90 lbs formulation | | | | | | |
| AQUAFLOW-NHS 300 | 16.2 | 16.2 | 16.2 | 16.2 | 16.2 | 16.2 |
| AQUAFLOW-RM 8-W | 24.0 | 24.0 | 24.0 | 24.0 | 24.0 | 24.0 |
| Initial Viscosity | | | | | | |
| KU | 95.2 | 103.9 | 61.6 | 78.0 | 96.5 | 101.5 |
| ICI | 0.8 | 1.1 | 0.4 | 0.5 | 0.9 | 1.1 |
| PH | 8.46 | 8.76 | 8.88 | 8.71 | 8.72 | 8.77 |
| Gloss 20°/60°/85° 3 mil Drawdown on paper** | | | | | | |
| 3 day dry | 12/49/87 | 9/45/87 | 37/70/93 | 28/65/87 | 6/38/85 | 11/49/89 |
| 7 day dry | 11/48/87 | 8/43/87 | 34/69/91 | 27/64/86 | 6/38/85 | 10/48/86 |
| Flow and Leveling 1-day dry*** | 10 separation on surface | 10 heavy separation on surface | 10 heavy foam/ separation surface | 10 foam on the surface | 10 heavy separation/ haze surface | 8 lines very visible |
| ASTM D 4400 Sag results- 1-day dry**** | 8-8 | 8-8 | 6-6 | 6-6 | 8-8 | 8-8 |
| Wetting test- on day 1***** | 2 | 2 | 2 | 2 | 2 | 4 |

*dry means water free, in contrast, a wet basis means water inclusive.
**mil is the thickness of the wet drawdown made using a bar applicator in a paint drawdown test
***1-10 Rating scale for Flow and Leveling: 1 Worst; 10 Best
****ASTM D 4400 Sag Test, Anti-Sag Index: 3—Very poor sag resistance; 6—Fair sag resistance; 8—Good sag resistance; 10—Very good sag resistance; 12—Excellent sag resistance
*****For wetting test observe while wet for crawling; 1-5 Rating scale for Wetting: 1—very very heavy; 2—very heavy; 3—moderate; 4—slight; 5—best no crawling Two ZONIX formulations were compared for paint formulation compatibility and comparison against AGNIQUE PG 8105 and AGNIQUE 8166 alkylpolyglucoside surfactants, RHODOLINE WA 100 surfactant, and BYK 345 silicone surfactant. Both Rhamnolipid samples showed good performance for viscosity, sag and flow leveling.

Figure 8:
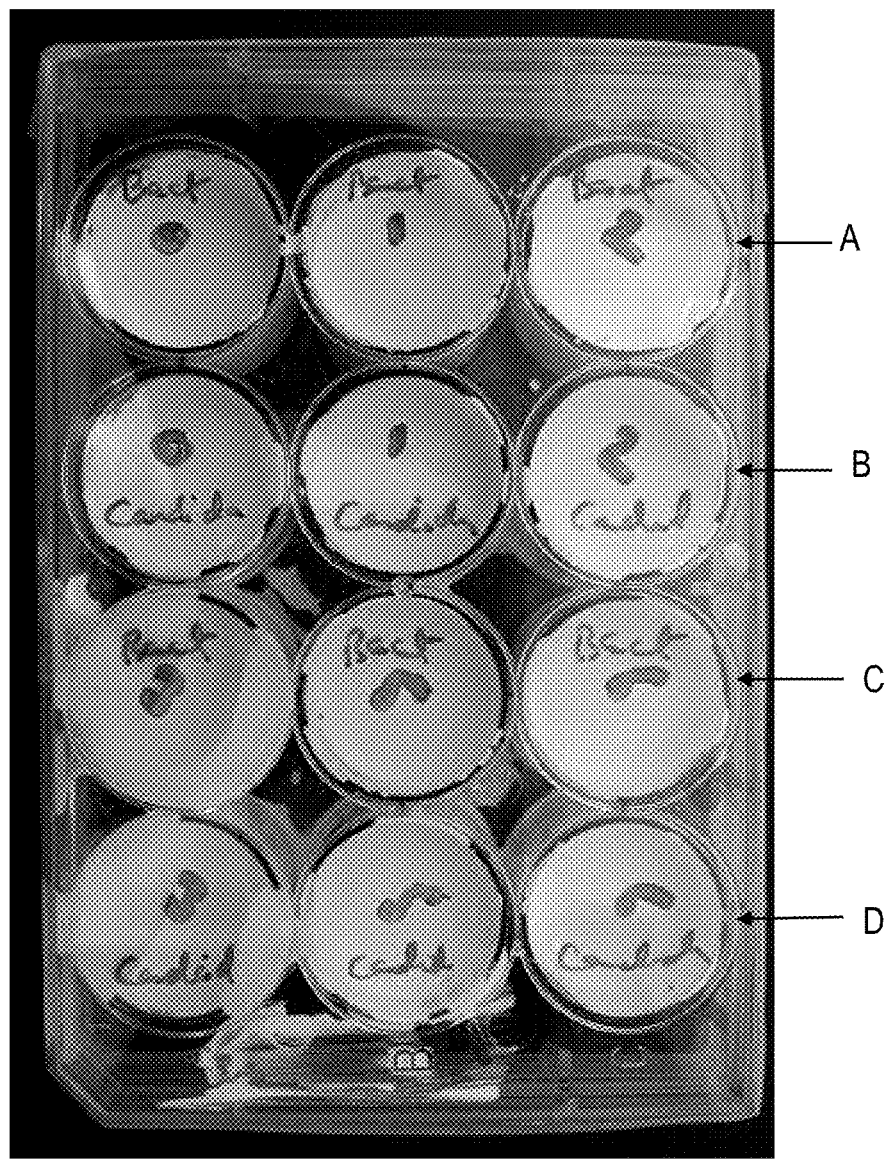
FIG. 8 shows cans for an in-can challenge test of Example 7 using a Semi-gloss formulation with bacteria and fungi.

These paints were then tested by an in-can challenge test for their efficacy against bacteria and fungi as shown in FIG. 8. Row A of cans of of FIG. 8 is paint inoculated with bacteria. Row B of cans of FIG. 8 is paint inoculated with fungi. Row C of cans of FIG. 8 is paint inoculated with bacteria. Row D of cans of FIG. 8 is paint inoculated with fungi. FIG. 8 shows cans for the in-can challenge test using the above-described semi-gloss formulation with bacteria and fungi having samples labeled as follows:

0 Blank (No Surfactant)
1 Paint with ZONIX 8.5% Rhamnolipid
2 Paint with ZONIX JBR 505
3 Paint with AGNIQUE PG 8105
5 Paint with RHODOLINE WA100
6 Paint with BYK 345.

Figure 9:
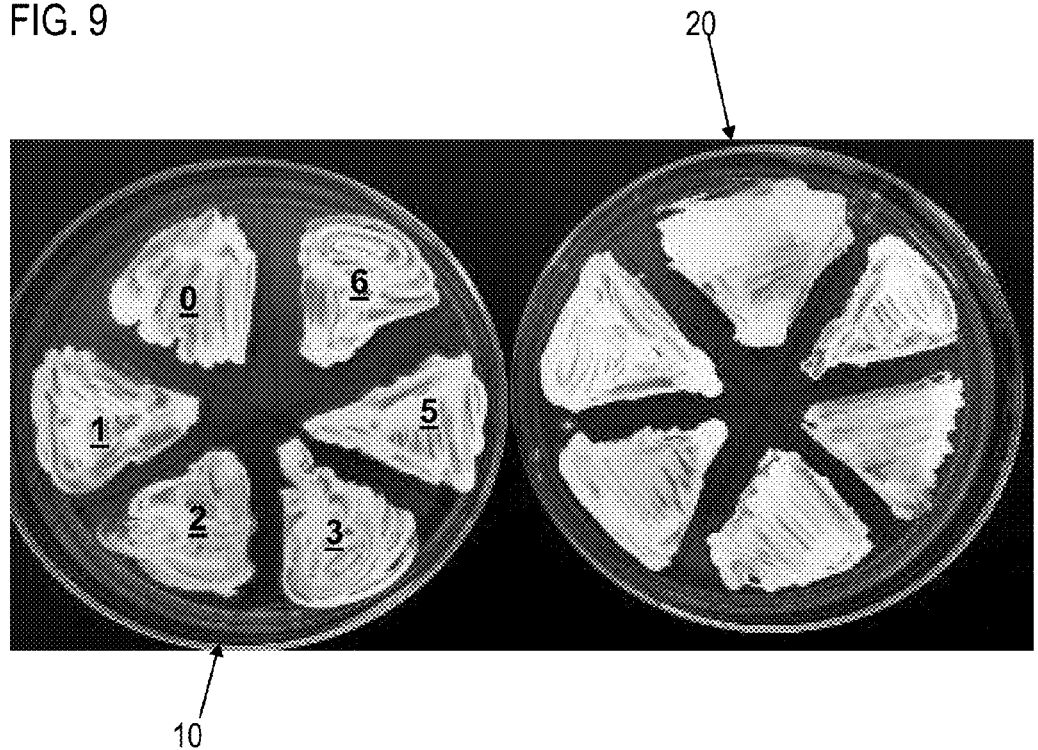
FIG. 9 shows samples on plates for the in-can challenge test of Example 7 using the semi-gloss formulation to show recovery of organisms at Zero Time (Challenge day 0), wherein the plate on the left is for a Bacterial Challenge and the plate on the right is for a Fungal Challenge.

FIG. 9 shows samples 0-6 on plates for the in-can challenge test of FIG. 8 using the semi-gloss formulations 0-6 of FIG. 8 to show recovery of organisms at Zero Time (Challenge Day 0). The plate on the left (Plate 10) is for the Bacterial Challenge and the plate on the right (Plate 20) is for the Fungal Challenge. Although both plates 10, 20 have samples 0-6, only plate 10 labels the samples because the results were the same for all the samples of plate 20. Plate 10 labels the samples as follows:

0 Blank (No Surfactant)
1 Paint with ZONIX 8.5% Rhamnolipid
2 Paint with ZONIX JBR 505
3 Paint with AGNIQUE PG 8105
5 Paint with RHODOLINE WA100
6 Paint with BYK 345.

FIG. 9 shows the plate 10 on the left inoculated with bacteria and the plate 20 on the right inoculated with fungi. FIG. 9 showed 0 time recovery of bacteria and fungi. The fungi on plate 20 did not recover (regrow) at 0 time. This lack of recovery is indicated by the bright white appearance of the samples on plate 20 of FIG. 9. In contrast, the bacteria recovered (regrow) at 0 time. This recovery of the bacteria at 0 time is indicated by a hazy appearance on the paint samples of plate 10 in FIG. 9. After 24 hours the same paints were tested for bacteria and fungi recovery.

Figure 10:
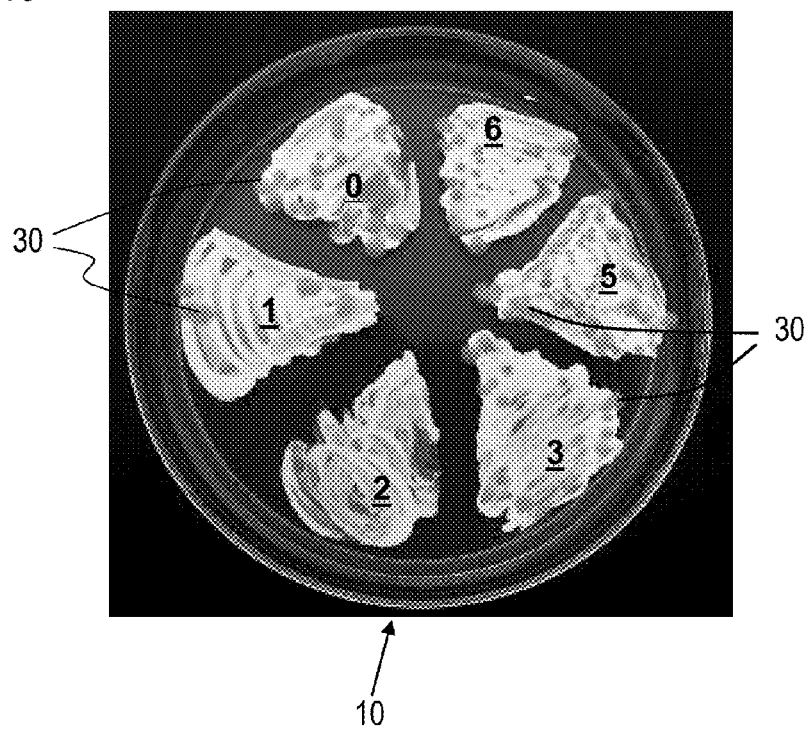
FIG. 10 shows samples on a plate for the in-can challenge test of Example 7 using the semi-gloss formulation to show recovery of organisms after 24 hours (Challenge day 1) for the Bacterial Challenge.

FIG. 10 shows samples of paints 0-6 on plate 10 for the in-can challenge test of Example 7 using the semi-gloss formulation to show recovery of organisms after 24 hours (Challenge day 1), for the Bacterial Challenge having samples labeled as follows:

0 Blank [No Surfactant]
1 Paint with ZONIX 8.5% Rhamnolipid
2 Paint with ZONIX JBR 505
3 Paint with AGNIQUE PG 8105
5 Paint with RHODOLINE WA100
6 Paint with BYK 345.

As shown in FIG. 10 sample "0" which is the blank with no surfactant had the most recovery of bacteria, seen as bacterial colonies 30. The paints 0-6 containing the Rhamnolipids showed inhibition of bacteria after 1 day of challenge compared to all other tested surfactant paints.

TABLE 10 lists Challenge Day 1 data from FIG. 10 plus Challenge Day 0 and Challenge Day 7 data in table format for this in-can efficacy test against bacteria in the semi-gloss paint formulation.

TABLE 10

| Paint ID | Surfactant in the Paint | Bacterial Recovery Rating | | |
|---|---|---|---|---|
| | | day 0 | day 1 | day 7 |
| 0 | No Surfactant | 4 | 2 | 0 |
| 1 | ZONIX ™ [8.5%] | 4 | 1 | 0 |
| 2 | ZONIX ™ JBR 505 | 4 | 0 | 0 |
| 3 | AGNIQUE PG 8105 | 4 | 2 | 0 |
| 5 | RHODOLINE WA100 | 4 | 3 | 0 |
| 6 | BYK | 4 | 3 | 0 |

Bacterial Recovery Rating:
4 100% recovery
3 80% recovery
2 50% recovery
1 10% recovery
0 No recovery Example 8

A second batch of flat paint formulation was prepared without any surfactants. Then Rhamnolipids (RL) were post-added to this formulation. The formulation was then subjected to an initial screen challenge test using 250 to 2000 ppm RL with mixed populations of *E. coli* and *Pseudomonas aeruginosa*. The results of this test for anti-bacterial activity are shown in TABLE 11. Rhamnolipid in this paint could not control the bacterial population.

TABLE 11

| | Challenge day 1 | Challenge day 2 | Challenge day 5 |
|---|---|---|---|
| Blank | + | + | + |
| RL 250 ppm | + | + | + |
| RL 500 ppm | + | + | + |
| RL 1000 ppm | + | + | + |
| RL 5000 ppm | + | + | + |

Using the same paints, a biocide at lower use level was combined with Rhamnolipid (RL) at a minimum use of 250 ppm. TABLE 12 shows some benefit in combining RL with MIT and BIT against fungi, but none against bacteria.

TABLE 12

Challenge test of combinations of Rhamnolipids with Isothiazolinones

| | Day 1 | | Day 2 | | Day 5 | |
|---|---|---|---|---|---|---|
| | Bacteria | Fungi | Bacteria | Fungi | Bacteria | Fungi |
| CMIT | − | − | − | − | − | − |
| RL 250 ppm + CMIT/MIT 5 ppm | + | − | + | − | + | − |
| MIT 25 ppm | − | + | − | + | − | − |
| RL 250 ppm + MIT 25 ppm | − | − | − | − | − | − |
| BIT 50 ppm | − | + | − | + | − | + |
| RL 250 ppm + BIT 50 ppm | − | − | − | + | − | + |

+ Growth
− no growth

TABLE 12 shows the combination of Rhamnolipid with CMIT/MIT, MIT, and BIT may show synergy against fungi.

In the above detailed description, preferred embodiments are described in detail to enable practice of the invention. Although the invention is described with reference to these specific preferred embodiments, it will be understood that the That which is claimed:

1. An aqueous coating composition, comprising a dispersion comprising
   (a) at least one latex polymer binder;
   (b) a biocide effective amount of at least one biocide comprising at least one biosurfactant selected from the group consisting of rhamnolipids and sophorolipids; and
   (c) water.

2. The composition of claim 1, wherein the biosurfactant is selected from the group consisting of rhamnolipids.

3. The composition of claim 1, wherein the biosurfactant is selected from the group consisting of sophorolipids.

4. The composition of claim 1, wherein the biosurfactant is rhamnolipids and sophorlipids.

5. The composition according to claim 1, wherein said at least one biocide further comprises an isothiazolinone biocide.

6. The composition of claim 1, further comprising at least one pigment and wherein the latex polymer comprises at least one acrylic monomeric unit.

7. The composition according to claim 6, wherein the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

8. A process for using a biosurfactant for polymerization, comprising the step of emulsion polymerizing a reaction mixture to prepare a latex polymer binder, said reaction mixture comprising at least one monomer and at least one biosurfactant selected from the group consisting of rhamnolipids and sophorolipids.

9. The process of claim 8, wherein the biosurfactant is selected from the group consisting of sophorolipids.

10. The process of claim 8, wherein the biosurfactant is rhamnolipids and sophorlipids.

11. The process according to claim 8, wherein the emulsion polymerizing comprises: forming a stable aqueous pre-emulsion from the at least one monomer and the biosurfactant, and forming said reaction mixture comprising the pre-emulsion, an initiator, and water.

12. The process according to claim 8, wherein the emulsion polymerizing comprises: forming an initiator solution comprising the initiator; forming a stable aqueous stable pre-emulsion comprising the at least one monomer and the biosurfactant; adding the initiator solution to a reactor; and adding the pre-emulsion to the reactor to form the reaction mixture.

13. The process according to claim 8, wherein the biosurfactant is selected from the group consisting of rhamnolipids.

14. The process according to claim 8, further comprising at least one pigment.

15. The process of claim 8, wherein the latex polymer is derived from at least one acrylic monomer selected from the group consisting of acrylic acid, acrylic acid esters, methacrylic acid, and methacrylic acid esters.

16. The process according to claim 8, comprising
   forming a stable aqueous pre-emulsion from said at least one first monomer, at least one second monomer and the biosurfactant, and
   forming said reaction mixture comprising the pre-emulsion, an initiator, and water,
   wherein said at least one first monomer is at least one acrylic monomer selected from the group consisting of acrylic acid, acrylic acid esters, methacrylic acid, and methacrylic acid esters, and
   wherein the at least one second monomer is selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

17. The process of claim 16, wherein the pre-emulsion is made of 0.001 to 10% by weight of the biosurfactant with respect to the total weight of aqueous pre-emulsion.

18. The process of claim 16, wherein the pre-emulsion comprises 0.5 to 10 parts by weight surfactant per 100 parts monomers used to form the latex polymer, wherein the surfactant is an emulsifier blend comprising (i) said biosurfactant and (ii) at least one non-ionic surfactant or anionic surfactant, wherein the aqueous pre-emulsion comprises sufficient emulsifier blend to stabilize the aqueous pre-emulsion.

19. The process of claim 18, wherein at least 5 wt. % of the emulsifier blend is said biosurfactant.

20. The process according to claim 8, further comprising adding an isothiazolinone biocide to the emulsion after polymerization.

21. The process of claim 8, wherein the emulsion polymerizing comprises the following sequential steps:
   a) forming a stable aqueous pre-emulsion from a monomer and the biosurfactant,
   b) forming said reaction mixture comprising the pre-emulsion, an initiator, and water
   c) introducing the reaction mixture into a reactor and adding from 1 to 10% by weight of said pre-emulsion into said reaction mixture, and
   d) heating said reaction mixture obtained at the end of step c) to a temperature of between 40° C. and 90° C. to generate a seed formed of latex particles in dispersion in the water.

22. A formulation for including in an architectural coating comprising a latex polymer binder prepared by emulsion polymerizing a reaction mixture, said reaction mixture comprising at least one monomer and at least one biosurfactant selected from the group consisting of rhamnolipids and sophorolipids.

23. A method of preparing an aqueous architectural coating composition, comprising mixing at least one latex polymer binder aqueous dispersion with a biocide and/or mildewcide effective amount of at least one biocide comprising at least one biosurfactant selected from the group consisting of rhamnolipids and sophorolipids in the presence of water.

24. The method of claim 23, wherein the biosurfactant is selected from the group consisting of rhamnolipids.

25. The method of claim 23, wherein the biosurfactant is selected from the group consisting of sophorolipids.

26. The method of claim 23, wherein the biosurfactant is rhamnolipids and sophorolipids.

27. The method according to claim 24, wherein the at least one latex polymer binder includes at least one member selected from the group consisting of pure acrylics, styrene acrylics, vinyl acrylics and acrylated ethylene vinyl acetate copolymers.

28. The method according to claim 23, further comprises adding at least one additive selected from the group consisting of dispersants, surfactants, rheology modifiers, defoamers, thickeners, additional biocides, colorants, waxes, perfumes and co-solvents to a mixture comprising the latex polymer and water.

29. The method according to claim 23, further comprising adding at least one pigment.

30. The method of claim 23, wherein when the biosurfactant compound is added to the base aqueous latex coating dispersion in an amount of about 0.01 to 10 parts per 100 parts by weight of latex polymer dispersion or total weight of coating composition.

31. The method of claim 23, further comprising adding at least one pigment to the formulated aqueous coating composition, wherein the formulated aqueous coating composition is paint.

32. The method of claim 23, wherein the aqueous coating composition further comprises isothiazolinone biocide.

* * * * *